(12) United States Patent
Park

(10) Patent No.: US 11,871,874 B2
(45) Date of Patent: Jan. 16, 2024

(54) TUMBLER FOR PREPARING BEVERAGE AND ADDITIVE-STORING CAPSULE THEREFOR

(71) Applicant: Moon Sik Park, Incheon (KR)

(72) Inventor: Moon Sik Park, Incheon (KR)

( * ) Notice: Subject to any disclaimer, the term of this patent is extended or adjusted under 35 U.S.C. 154(b) by 178 days.

(21) Appl. No.: 17/262,127

(22) PCT Filed: Jul. 31, 2019

(86) PCT No.: PCT/KR2019/009525
§ 371 (c)(1),
(2) Date: Jan. 21, 2021

(87) PCT Pub. No.: WO2020/027567
PCT Pub. Date: Feb. 6, 2020

(65) Prior Publication Data
US 2021/0345832 A1    Nov. 11, 2021

(30) Foreign Application Priority Data

Jul. 31, 2018 (KR) .......................... 10-2018-0089275
Jul. 15, 2019 (KR) .......................... 10-2019-0085190
(Continued)

(51) Int. Cl.
*A47J 43/27* (2006.01)
*B65D 81/32* (2006.01)
(Continued)

(52) U.S. Cl.
CPC .............. *A47J 43/27* (2013.01); *B05B 11/10* (2023.01); *B05B 11/1045* (2023.01);
(Continued)

(58) Field of Classification Search
CPC ...... A47J 43/27; B05B 11/30; B05B 11/3045; B05B 11/3052; B05B 11/10;
(Continued)

(56) References Cited

U.S. PATENT DOCUMENTS 7,850,043 B2 * 12/2010 Foster ................. B05B 11/0056
222/207
9,117,205 B2 * 8/2015 Virella .................. G07F 7/0609
(Continued)

FOREIGN PATENT DOCUMENTS

JP       2004-001788       1/2004
JP       2010-001062       1/2010
(Continued)

OTHER PUBLICATIONS

English Specification of 10-2017-0113433.
(Continued)

*Primary Examiner* — Frederick C Nicolas
(74) *Attorney, Agent, or Firm* — Sughrue Mion, PLLC

(57) ABSTRACT

Provided is a tumbler for beverage making including a drinking water tray including a lower tray which has an open top and a closed bottom to form a storage space for storing drinking water or a beverage therein, and an upper tray which is detachably coupled to the top of the lower tray to close the open top of the lower tray and has a drinking aperture formed therein to enable a user to drink the drinking water or beverage in the storage space; an additive tray which is detachably coupled to the bottom of the drinking water tray, and has an additive storage space for storing an additive formed therein; and a pumping unit which is mounted to penetrate through the drinking water tray and the additive tray so as to pump the additive and supply same to a drinking water storage space.

54 Claims, 24 Drawing Sheets

(30) Foreign Application Priority Data

Jul. 15, 2019 (KR) ........................ 10-2019-0085276
Jul. 15, 2019 (KR) ........................ 10-2019-0085278

(51) Int. Cl.
    *B05B 11/10*     (2023.01)
    *B65D 1/26*     (2006.01)

(52) U.S. Cl.
    CPC ............ *B05B 11/1052* (2023.01); *B65D 1/26* (2013.01); *B65D 81/3211* (2013.01)

(58) Field of Classification Search
    CPC ............ B05B 11/1045; B05B 11/1052; B65D 81/3211; B65D 1/26
    See application file for complete search history.

(56) References Cited

U.S. PATENT DOCUMENTS

| | | | |
|---|---|---|---|
| 9,745,115 B2 * | 8/2017 | Hall | B65D 81/3211 |
| 10,314,320 B2 * | 6/2019 | Roberts | A47J 31/441 |
| 10,549,898 B2 * | 2/2020 | Park | B65D 1/22 |
| 2003/0052019 A1 * | 3/2003 | Song | B65D 81/3211 |
| | | | 206/219 |
| 2010/0064899 A1 * | 3/2010 | Aardenburg | A47J 31/3638 |
| | | | 83/660 |
| 2014/0186507 A1 * | 7/2014 | Wales | A23L 2/00 |
| | | | 426/519 |
| 2015/0223632 A1 * | 8/2015 | Hall | B65D 85/804 |
| | | | 99/295 |
| 2016/0242594 A1 | 8/2016 | Empl et al. | |
| 2017/0326617 A1 | 11/2017 | Shabudin et al. | |

FOREIGN PATENT DOCUMENTS

| | | |
|---|---|---|
| KR | 20-0419746 | 6/2006 |
| KR | 10-2012-0021781 | 3/2012 |
| KR | 10-2017-0113433 | 10/2017 |
| KR | 10-2018-0022408 | 3/2018 |

OTHER PUBLICATIONS

English Specification of 20-0419746.
English Specification of JP2004-001788.
English Specification of JP2010-001062.
English Specification of 10-2012-0021781.
English Specification of 10-2018-0022408.

* cited by examiner (a)　　　　　　(b)

(a)            (b)

(a)          (b)

(a)          (b)

(a)  (b)

(a)  (b)

TUMBLER FOR PREPARING BEVERAGE AND ADDITIVE-STORING CAPSULE THEREFOR

TECHNICAL FIELD

The present invention relates to a tumbler for beverage making, and more specifically, a tumbler for preparing a beverage, that accommodates drinking water and an additive together d pumps and adds the additive to the drinking water as needed by the user to thereby prepare a beverage and that maintains airtightness to prevent the beverage from leaking out and an additive storage capsule inserted and used in the tumbler.

BACKGROUND ART

With the recent trend of carrying and drinking beverages and concern about the harmfulness of disposable cups, more and more people carry and drink using their personal tumbler.

The personal tumbler is generally composed of a cylindrical container body and a lid that opens and closes the top of the container body and is configured to store a beverage in the container body and allow the user to open the lid and drink the beverage.

Meanwhile, as tumblers come in wide use, athletes, fitness trainers, bodybuilders or such users are more likely to mix water and other beverages, such as milk, and accordingly, various relevant products are being developed.

As a conventional tumbler-related technique, Korean Patent Application Publication No. 10-2018-0022408 discloses a shaker tumbler that includes a tumbler body comprising a receiving portion configured to accommodate contents therein, a tumbler body configured to be coupled to one side of the tumbler body and to prevent the contents contained in the tumbler body from being discharged to the outside, a lower housing configured to be positioned at a lower portion of the tumbler body and including a shaking gear, a shaking rod coupled to an upper surface of the lower housing to be rotatable and configured to mix the contents accommodated in the tumbler body, and a gear button coupled to one surface of the lower housing and playing a role to drive the shaking gear e shaking rod.

However, the above-described conventional tumbler has inconvenience in making beverages by adding additives to drinking water, since the additives need be stored separately and the user withdraw the additives and add them to drinking water. Further, the conventional tumbler is not free from sanitary issues and waste of the additives due to the likelihood of leakage of the additives upon making a beverage.

DETAILED DESCRIPTION OF THE INVENTION

Technical Problems

The present invention aims to provide a tumbler for beverage making that may prevent waste of additives and improve hygiene by increasing airtightness so that beverages including additives do not leak to the outside during beverage making.

The present invention also aims to provide a tumbler for beverage making, which may improve the usability and hygiene by allowing drinking water and a liquid additive to be stored in the tumbler without the need to separately store the additive, provides easier beverage making by allowing a constant amount of additive to be added through an embedded pumping unit, is configured to be able to remove the internal negative pressure which may arise upon pumping to thereby smooth pumping, thus allowing the additive to be discharged in a constant amount.

The present invention also aims to provide a tumbler for beverage making, which may be disassembled by the user's simple manipulation, easy to wash, and improve hygiene unlike the conventional tumbler which is difficult to disassemble the interior of the pumping part and thus hard to clean the flowpath in the pumping part.

The present invention has been conceived to address the foregoing issues and an object of the present invention is to provide a tumbler for beverage making, which is easy to use as the structure of the closing part is configured to be horizontally rotated and prevents the closing part from being unintentionally open by, e.g., external force when carried, thereby preventing any sanitary issues from arising due to leakage of the contents.

The present invention also aims to provide an additive storage capsule that may prevent the additive from leaking out while injecting the additive and allows for easier insertion of the additive by having the additive storage container directly placed in the tumbler for beverage making.

The present invention also provides an additive storage capsule that may be easily received and replaced in the tumbler.

Means to Address the Problems

To achieve the foregoing objectives, according to the present invention, a tumbler for beverage making may comprise a drinking water tray including a lower tray having a drinking water storage space having an open upper portion and a closed lower portion and storing drinking water or a beverage and an upper tray detachably coupled to the upper portion of the lower tray to shield the upper portion of the lower tray, the upper tray having a mouthpiece through which a user may drink the drinking water or beverage in the drinking water storage space, an additive tray detachably coupled to a lower end of the drinking water tray and having an additive storage space storing an additive therein, and a pumping unit installed through the drinking water tray and the additive tray, the pumping unit pumping the additive to the drinking water storage space, wherein the pumping unit includes: a pumping button part installed to slidingly reciprocate on the upper tray and moved when pressurized by the user, and a pumping part positioned in the drinking water storage space of the lower tray, ascending or descending by the reciprocation of the pumping button part, connected to communicate with the drinking water storage space and the additive storage space to suck the additive and discharge the additive to the drinking water storage space when ascending or descending.

The pumping unit may further include an airtight means that is coupled to the pumping button part to partition the pumping button part from the drinking water storage space to maintain airtightness and that shields the pumping button part from the drinking water storage space.

The upper tray may include a closure part detachably coupled to the lower tray and having an upper surface through which the mouthpiece is formed and the pumping unit is installed apart from the mouthpiece, a rotary closing part rotatably coupled to an upper portion of the closure part and rotating around a rotation shaft extending inwardly and downwardly, the rotary closing part having an opening formed to expose the closure part to allow an upper portion of the pumping unit or the mouthpiece to be exposed through the opening upon rotation, and a shielding support positioned in a lower portion of the closure part and having an upper portion fixed to the rotary closing part, the shielding support configured to move along an axial direction of the rotary closing part and rotate as the rotary closing part rotates to open or close the mouthpiece when the rotary closing part rotates.

The shielding support may include a rotation shaft part coupled to the rotation shaft to ascend or descend along the rotation shaft; a support body allowing the rotation shaft part to be rotatably inserted thereinto and having an upper end and lower end supported by the rotation shaft part to ascend or descend in interlocking with the rotation shaft part and a shielding part having a first end coupled to an outer surface of the support body and a second end extending from the first end to open or close the mouthpiece.

According to the present invention, there is provided an additive storage capsule embedded and used in a tumbler and coupled to a lower end of the tumbler and inserted into an additive tray for receiving an additive pumped into an inside of a body of the tumbler, the additive storage capsule comprising a side wall part positioned in contact with an inner surface of the additive tray, a bottom portion positioned in contact with a bottom surface of the additive tray, and a sealing film sealing an upper portion of the side wall part.

The bottom portion may include a bottom protrusion protruding inwardly and upward in a central portion thereof and a bottom surface portion formed between the bottom protrusion and the side wall part.

Effects of the Invention

The tumbler for beverage making according to the present invention provides the following effects.

First, airtight means may prevent leakage of the additive or beverage during pumping or use by improving airtightness so that the additive does not leak to the outside during beverage making, thereby preventing waste of additives and improving hygiene when carried.

Second, it is possible to easily store liquid additives by allowing the additive tray, which is capable of storing and retaining liquid additives, to be detachably coupled to the drinking water tray which contains drinking water. Further, as the additive is separately retained, a constant amount of additive may be added in the tumbler without the need for separately storing and withdrawing the additive. This leads to an easier making of a beverage using additives.

Third, unlike the conventional one which has difficulty in disassembling the pumping unit and hence cleaning the interior of the pumping unit, the tumbler according to the present invention is configured to allow for an easier cleaning of even interior of the pumping unit so that the moving flowpath of the additive may be cleaned, thus providing better hygiene.

Fourth, as each component including, e.g., the pumping unit and the upper tray may be easily disassembled and reassembled only with simple manipulation, the tumbler may be easily cleaned and stored.

Fifth, the tumbler has an air introduction means by which the tumbler may prevent functional deterioration of the pumping unit due to the internal negative pressure. Thus, the amount of additive which is discharged may be maintained constant so that beverage making may remain uniform or constant.

Sixth, the user may horizontally turn the opening/closing structure of the rotary closing part, with it coupled to the tray, to thereby adjust the shielding state corresponding to the drinking state, pumping state, and storing state. Thus, it may be possible to prevent the rotary closing part from being open due to, e.g., unintentional external force when the tumbler is carried, and hence prevent sanitary issues that may arise due to leakage of the contents.

Seventh, rather than directly putting the additive into the tumbler for beverage making, an additive storage capsule storing the additive is received and used. Thus, it may be possible to address additive loss or sanitary issues due to leakage of the additive which may arise when a liquid additive is injected to the tumbler and to easily inject the additive to the tumbler.

Eighth, the additive storage capsule according to the present invention has an inclined step part on the outer circumferential surface of the capsule, so that the additive storage capsule ay be placed in a correct position in the additive storage space. Further, upon replacing the capsule, it is possible to easily remove the capsule from the tumbler by rotational force using the inclined step part.

BEST MODE TO PRACTICE THE INVENTION

Figure 1:
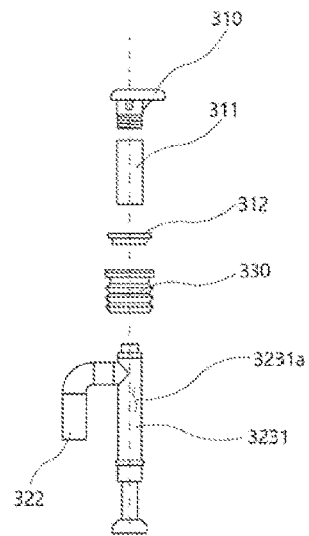
FIG. 1 is an exploded view illustrating a configuration of a pumping unit which is a main component of a tumbler for tumbler for beverage making according to an embodiment of the present invention.

According to a preferred embodiment of the present invention, a tumbler for beverage making may comprise a drinking water tray including a lower tray having a drinking water storage space having an open upper portion and a closed lower portion and storing drinking water or a beverage and an upper tray detachably coupled to the upper portion of the lower tray to shield the upper portion of the lower tray, the upper tray having a mouthpiece through which a user may drink the drinking water or beverage in the drinking water storage space, an additive tray detachably coupled to a lower end of the drinking water tray and having an additive storage space storing an additive therein, and a pumping unit installed through the drinking water tray and the additive tray, the pumping unit pumping the additive to the drinking water storage space, wherein the pumping unit includes: a pumping button part installed to slidingly reciprocate on the upper tray and moved when pressurized by the user, and a pumping part positioned in the drinking water storage space of the lower tray, ascending or descending by the reciprocation of the pumping button part, connected to communicate with the drinking water storage space and the additive storage space to suck the additive and discharge the additive to the drinking water storage space when ascending or descending.

Preferably, the upper tray includes a closure part detachably coupled to the lower ray and having an upper surface through which the mouthpiece is formed and the pumping unit is installed apart from the mouthpiece, a rotary closing part rotatably coupled to an upper portion of the closure part and rotating around a rotation shaft extending inwardly and downwardly, the rotary closing part having an opening formed to expose the closure part to allow an upper portion of the pumping unit or the mouthpiece to be exposed through the opening upon rotation, and a shielding support positioned in a lower portion of the closure part and having an upper portion fixed to the rotary closing part, the shielding support configured to move along an axial direction of the rotary closing part and rotate as the rotary closing part rotates to open or close the mouthpiece when the rotary closing part rotates.

Specifically, the pumping unit further includes an airtight means that is coupled to the pumping button part to partition the pumping button part from the drinking water storage space to maintain airtightness and that shields the pumping button part from the drinking water storage space. The shielding support includes a rotation shaft part coupled to the rotation shaft to ascend or descend along the rotation shaft, a support body allowing the rotation shaft part to be rotatably inserted thereinto d having an upper end and lower end supported by the rotation shaft part to ascend or descend in interlocking with the rotation shaft part, and a shielding part having a first end coupled to an outer surface of the support body and a second end extending from the first end to open or close the mouthpiece.

According to the present invention, there is provided an additive storage capsule embedded and used in a tumbler and coupled to a lower end of the tumbler and inserted into an additive tray for receiving an additive pumped into an inside of a body of the tumbler, the additive storage capsule comprising a side wall part positioned in contact with an inner surface of the additive tray, a bottom portion positioned in contact with a bottom surface of the additive tray, and a sealing film sealing an upper portion of the side wall part.

Embodiments of the Invention

Hereinafter, various embodiments of the present invention are described in detail with reference to the accompanying drawings.

First, a tumbler for beverage making according to an embodiment of the present invention is configured to allow an additive to be mixed with drinking water or a beverage and the mixture to be ingested and, and as illustrated in FIG. 1, the tumbler is configured to allow an additive to be added in an amount set by a pumping unit provided in the tumbler. The tumbler is basically structured to shield the pumping unit from a drinking water storage space by an airtight means.

Hereinafter, various embodiments of the tumbler for producing a beverage will be described in detail.

Figure 2:
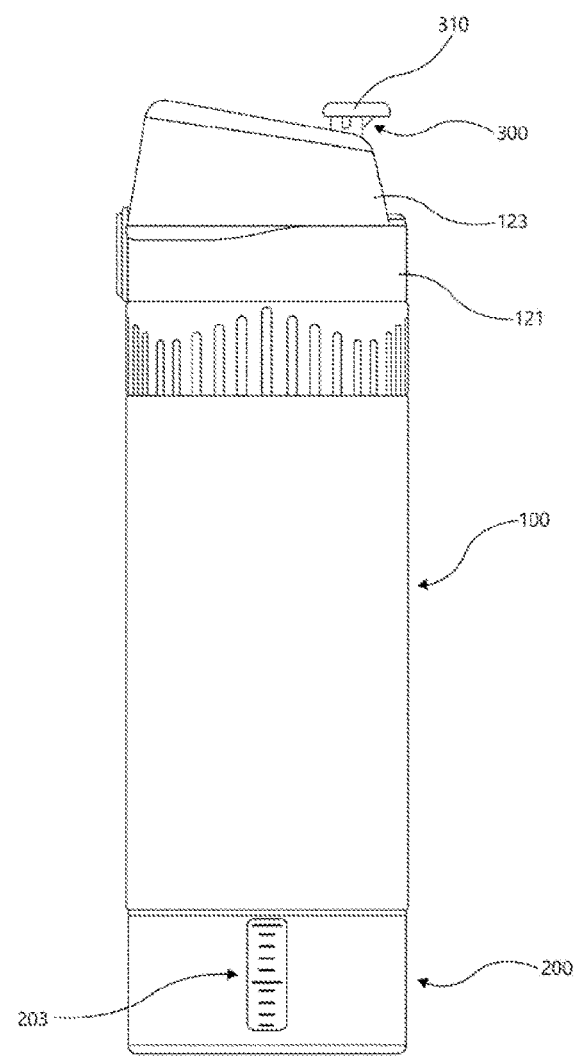
FIG. 2 is a front view of the tumbler for beverage making of FIG. 1.
Figure 3:
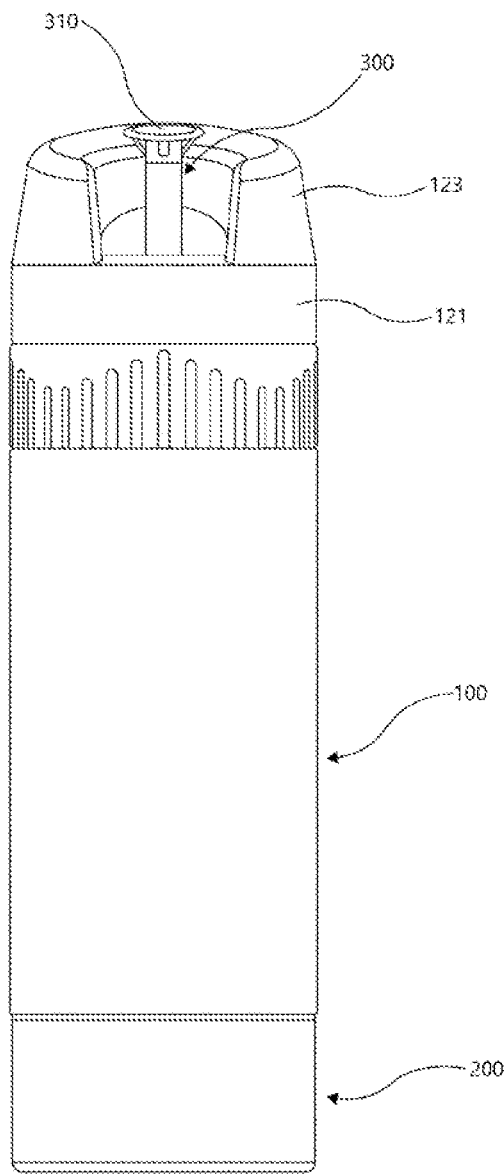
FIG. 3 is a right side view of the tumbler for beverage making of FIG. 1.

First, referring to FIGS. 2 and 3, the tumbler for beverage making according to an embodiment of the present invention may include a drinking water tray 100, an additive tray 200, and a pumping unit 300 coupled to the drinking water tray 100 and the additive tray 200.

Here, the additive tray 200 is coupled to a lower portion of the drinking water tray 100, and the pumping unit 300 is coupled to an upper portion of the drinking water tray 100, so as to be operated by the user.

Figure 4:
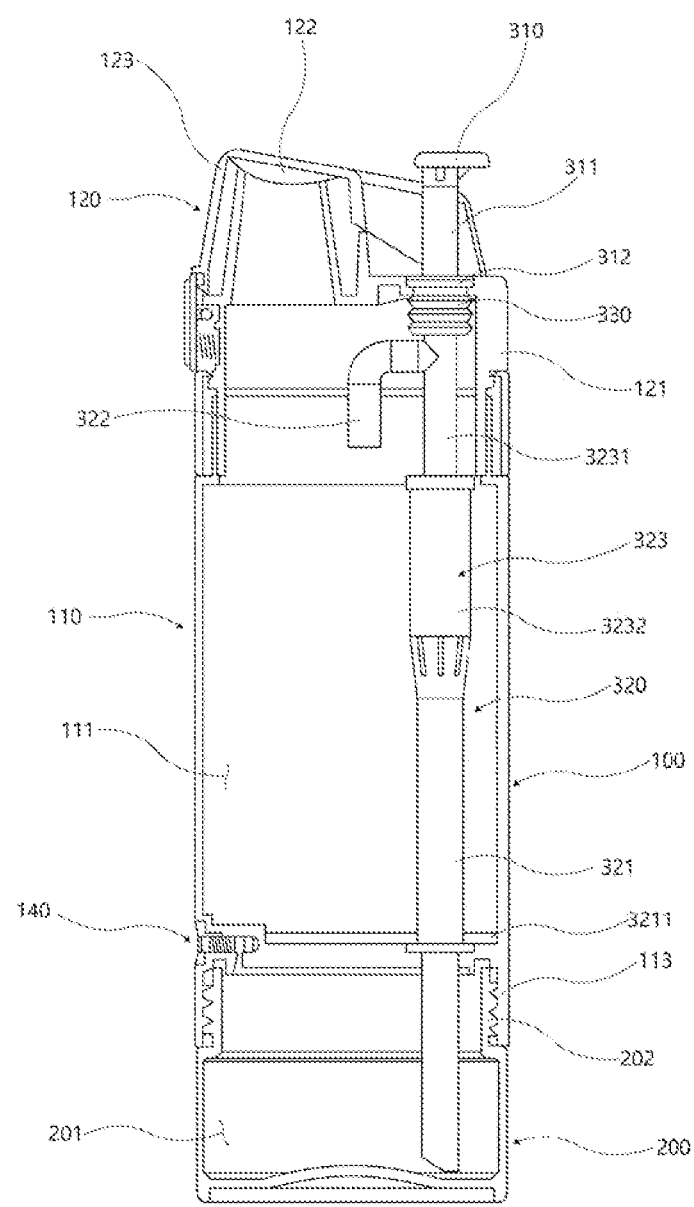
FIG. 4 is a front, cross-sectional view illustrating an internal structure of the tumbler for beverage of FIG. 2.
Figure 5:
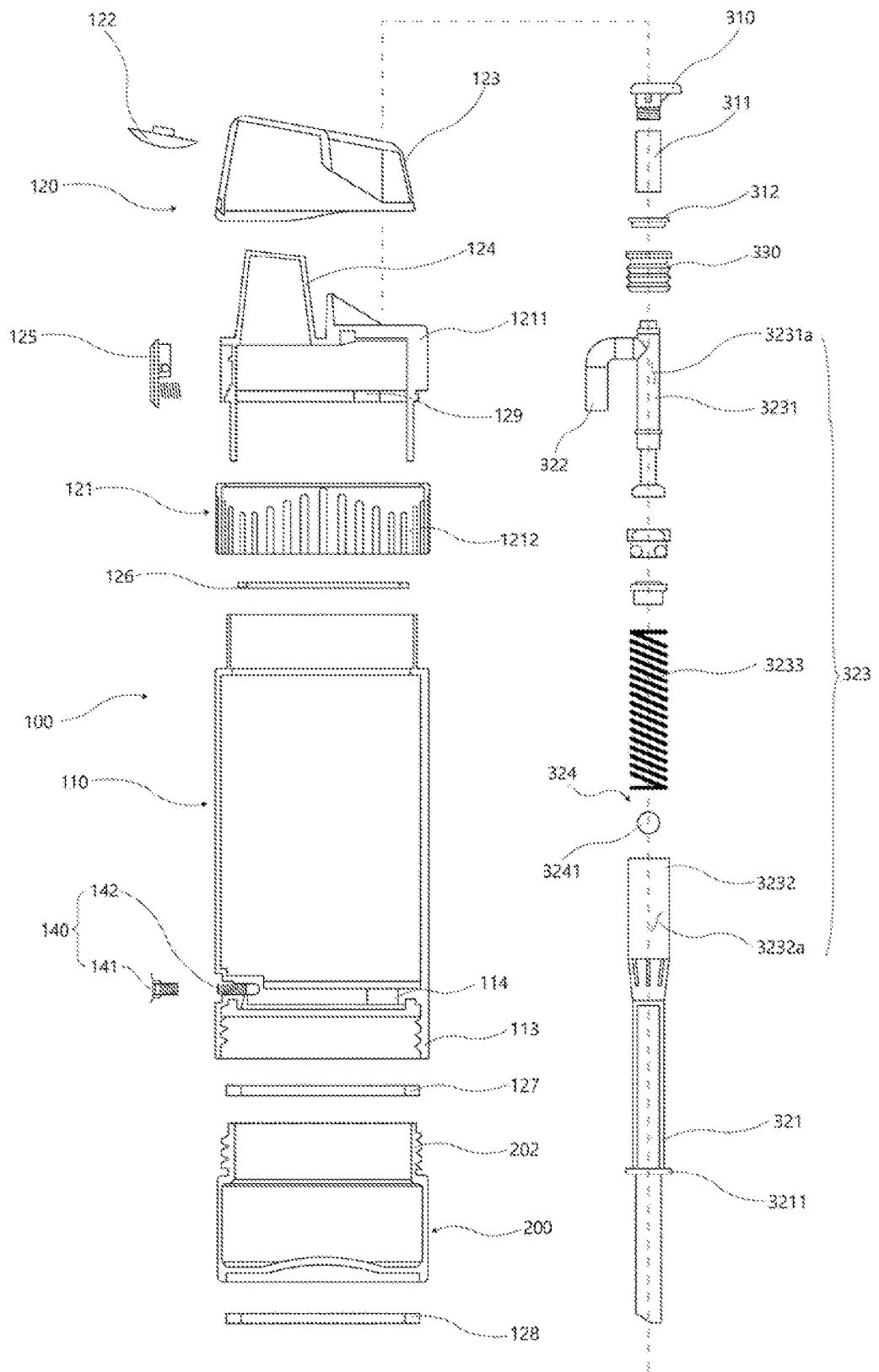
FIG. 5 is an exploded view of the tumbler for beverage making of FIG. 4.

Referring to FIGS. 4 and 5, the drinking water tray 100 is a portion constituting the body of the tumbler, and a drinking water storage space 111 is formed therein to store drinking water or beverages.

The drinking water storage space 111 is a space in which a beverage is prepared by adding a pumped additive to the stored drinking water, and is configured to provide the prepared beverage to a user.

The drinking water tray 100 may be configured in a cylindrical shape as shown. However, this is merely a preferred embodiment considering better usability and, without being limited to the cylindrical shape, the drinking water tray 100 may be formed to have its cross section formed in various shapes such as an oval or polygon.

The drinking water tray 100 may include a lower tray 110 and an upper tray 120.

The lower tray 110 has an open top and a closed bottom and includes a drinking water storage space 111 formed thereinside. A through-hole 114 is formed in the bottom of the lower tray 110 to allow the pumping unit 330 to be inserted therethrough.

Here, the through-hole 114 is formed to be adjacent to the inner circumferential side of the lower tray 110, off the center of the lower tray 110 towards the outer circumference viewed in plan view, so that the pumping unit 300 may be installed to be adjacent to the inner surface of the additive tray 200 and the drinking water tray 100.

The upper tray 120 is detachably coupled to the upper portion of the lower tray 110 to shield the open upper portion of the lower tray 110 and, after the drinking water storage space 111 is filled with drinking water, shields the drinking water storage space 111.

The upper tray 120 may include a closure part 121, a cap part 122, and a closing part 123 as shown.

The closure part 121 is detachably coupled to the lower tray 110 and has a mouthpiece 124 formed therein.

The mouthpiece 124 is a part that allows the user to drink the stored beverage, and is formed with a through-hole through which the user may drink the drinking water or beverage in the drinking water storage space 111. The mouthpiece 124 protrudes upwards to allow the user easier drinking. However, this, as a mere embodiment, is not limited thereto as long as it may achieve the above object.

An O-ring type packing 126 is provided between the closure part 121 and the lower tray 110, enhancing the airtightness of the lower tray 100 and the closure part 121.

The closure part 121 may be divided into an upper member 1211 having the mouthpiece 124 formed therein and a lower member 1212 coupled with the upper member 1211 and detachably coupled with the lower tray 110.

The closure part 121 is formed to have a circular cross-section so as to correspond to the shape of the cross-sectional shape of the cylindrical lower ray 110, and as shown, protrusions may be formed along the outer circumferential surface of the lower member 1212 to allow the user to easily separate from the lower tray 110.

Threads may be formed on the outer circumferential surface of the upper portion of the lower tray 110 and the inner circumferential surface of the lower portion of the closure part 121, respectively, so that the closure part 121 and the lower tray 110 may be detachably screwed to each other.

However, without being lit cited to the screwing way, the closure part 121 and the lower tray 110 may be detachably coupled together in any other various ways, e.g., snap coupling or button coupling, which allows for a coupling and decoupling and maintain airtightness.

Here, although the embodiment is described above in which the closure part 121 is separated into the upper member 1211 and the lower member 1212, this is merely an example, and the upper member 1211 and the lower member 1212 may be integrally formed with each other. Here, reference numeral 129 denotes a through-hole through which the pumping unit 300 is inserted and installed.

The cap part 122 serves to open and close the mouthpiece 124 by being coupled to the closure part 121.

As shown, the cap part 122 is coupled to the inner surface of the closing part 123 corresponding to the mouthpiece 124 so as to open and close the mouthpiece 124 as the closing part 123 is open and closed.

However, this is merely an embodiment, and the cap part 122 may be separated from the closing part 123 by a wire or the like according to the structure of the mouthpiece 124 and be configured as a separate component, or may be rotatably provided at the top of the closing part 123 or may be configured in other various manners.

The closing part 123 may be configured to be coupled to the upper portion of the closure part 121 to cover the closure part 121 and the cap part 122, thus shielding the upper portion of the drinking water tray 100 including the mouthpiece 124 and selectively opening and closing the mouthpiece 124 according to the user's manipulation and thereby allowing the user to easily drink the stored beverage.

The closing part 123 may be connected to the closure part 121 by a button part 125.

The button part 125 is configured as a clip as shown, and one side of the button part 125 is coupled to the outer circumferential side of the closure part 121, and the other side thereof is coupled to the closing part 123 so that the closing part 123 may be rotated on the closure part 121 to allow the closing part 123 to open and close the closure part 121 as it rotates.

The additive tray 200 is detachably coupled to the lower portion of the drinking water tray 100, and the additive tray 200 is configured to include an additive storage space 201 for storing additives, e.g., liquid additives.

The additive tray 200 has a cup shape and has an open top and closed bottom. The additive storage space 201 is formed inside the additive tray 200.

The additive tray 200 may be configured such that the open upper portion is detachably coupled to the lower portion of the drinking water tray 100.

As an example of such a detachable coupling, as shown, the drinking water tray 100 and the additive tray 200 may be detachably coupled through screw coupling.

To this end, the drinking water tray 100 has a first screw thread 113 formed on the lower inner surface, and the additive ray 200 has a second screw thread 202 formed on the upper inner surface facing the drinking water tray 100 to be engaged with the first screw thread 113, so that the drinking water tray 100 and the additive tray 200 may be detachably coupled together by screwing of the first screw thread 113 and the second screw thread 202.

Here, although in the illustrated embodiment, the first screw thread 113 and the second screw thread 202, respectively, are formed on the inner surface of the drinking water tray 100 and the outer surface of the additive tray 200, the first screw thread 113 and the second screw thread 202 may be formed on the outer surface of the drinking water tray 100 and the inner surface of the additive tray 200.

When the drinking water tray 100 and the additive tray 200 are detachably coupled by screwing as described above, a fastening force may be provided, effectively preventing separation of the additive tray 200 while in use and providing high airtightness and hence effectively preventing leakage of the additive.

However, although not shown, the drinking water tray 100 and the additive tray 200 may be detachably coupled via other methods than screwing.

For example, the drinking water tray 100 and the additive tray 200 may be configured to be detachably coupled in a snap coupling manner so as to provide a simplified shape and ease of manufacture. In this case, the drinking water tray 100 and the additive tray 200 are formed with a snap groove and a snap protrusion to form a step instead of screw threads, so that the drinking water tray 100 and the additive tray 200 may be detachably coupled in a snap coupling manner through press fitting.

As the additive tray 200 is formed in a structure that is detachably coupled with the drinking water tray 100 as described above, it may be configured in a cartridge type according to the type of additive, so that the user may choose an additive and then couple it to the drinking water tray 100 and easily make a beverage.

The additive tray 200 may be configured to have a transparent or semi-transparent checking portion 203 (see FIG. 2) to allow the inside to be visually checked, and the checking portion 203 has a graduation portion for checking the amount of the additive.

The pumping unit 300 is installed in each of the drinking water tray 100 and the additive tray 200 to pump the additive from the additive storage space 201 to the drinking water storage space 111. The pumping unit 300 is configured to move each constant amount by the user's pumping, thereby adjusting the amount of additive to be added depending on the number of times of pumping.

Specifically, the pumping unit 300 may include a pumping button part 310, a pumping part 320, and an airtight means 330.

The pumping button part 310 is installed to slidingly reciprocate on the upper portion of the drinking water tray 100 and is configured to reciprocate as pressurized by the user.

The pumping button part 310 may include a stem part 311 and a guide bushing 312.

The stem part 311 is installed through the insertion hole 129 formed in the upper part of the drinking water tray 100 so as to be slidably moved, and the upper portion of the stem part 311 is exposed to the outside from the upper portion of the drinking water tray 100 to be pressurized by the user, and the lower portion of the stem part 311 is configured to transfer external force to the pumping part 320.

The stem part 311 may be configured such that a button cap 313 (see FIG. 6) is coupled to an upper end of the stem part 311. The button cap 313 is formed so that an upper end thereof is broad in planar area than the stem part 311 to allow the user to easily operate the stem part 311, and the button cap 313 may be detachably screwed to the upper end of the stem part 311.

The guide bushing 312 is configured in a tubular shape to allow the stem part 311 to be inserted therethrough and to guide the stem part 311 to reciprocate.

The guide bushing 312 is inserted into the inside of the upper portion of the airtight member 330, and the lower end side of a flange formed at the upper end of the guide busing 312 comes in contact with the upper surface of the insertion hole 129 and is fixedly supported by the insertion hole, and the guide busing 312 is configured to allow the stem part 311 to be inserted along the inner circumferential surface or inner surface thereof.

The guide bushing 312 fixes the upper end of the airtight member 330 to the inner circumferential surface of the insertion hole 129 and reduces friction with the airtight member 330 when the stem part 311 moves up and down, preventing damage to the airtight member 330.

The pumping part 320 is located in the drinking water storage space and is moved up and down by the reciprocating movement of the pumping button part 310, and is connected to communication with each of the drinking water storage space 111 and the additive storage space 201, thereby sucking up the additive and discharging the additive to the drinking water storage space 111 as the pumping part 320 moves up or down.

The pumping part 320 may include a suction tube 321, a discharge tube 322, a piston part 323, and an opening/closing valve 324.

First, the suction tube 321 is shaped as a hollow tube and inserted through the through-hole 114 formed in the bottom of the lower tray 110 and erected. One side of the suction tube 321 extends to the inside of the additive tray 200 to communicate with the additive storage space 201, and the other side thereof is disposed in the drinking water storage space 111 so that the additive in the additive storage space 201 is introduced by the piston part 323.

In this case, the suction tube 321 is disposed adjacent to the inner surface of the additive tray 200 and the drinking water tray 100, and the lower end thereof is positioned adjacent to the bottom of the additive tray 200, so that the additive in the additive storage space 201 may be easily introduced and the additive may be sucked without leaving a residue by tilting the additive tray 200.

Although not shown, the pumping unit 300 may be configured to be located along the central axis of the additive tray 200 and the drinking water ray 100.

The suction tube 321 may be provided with a support tube 3211 at the bottom. The support tube 3211 allows the suction tube 321 to penetrate therethrough, is located on the through-hole 114 formed in the bottom of the lower tray 110 to ensure a minimum length of the suction tube 321 in the additive tray 200 and prevent the additive from flowing into the drinking water tray 100 between the through-hole 114 and the outer surface of the suction tube 321.

The support tube 3211 is formed of an elastic band to be fitted into the suction tube 321 or may be formed as a nut to be fastened by screwing.

Although not shown, a mesh may be installed at the suction end of the suction tube 321, preventing impurities from flowing into the pumping button part 310 and thus functional deterioration of the pumping button part 310.

The discharge tube 322, shaped as a hollow tube, is installed inside the drinking water storage space 111 and discharges the introduced additive to the drinking water storage space 111.

The discharge tube 322 has a hollow tube shape, and one side of the discharge tube 322 is connected to communicate with the upper portion of the piston rod 3231, and the other side thereof communicates with the drinking water storage space 111, supplying the additive, which has passed through the internal space 3232a of the piston housing 322 and the flow path 3231a of the piston rod 3231, to the drinking water storage space 111.

The discharge tube 322 may be bent downward, as shown, so that the additive may fall into the drinking water storage space 111. However, this is merely an embodiment, and the discharge tube 322 may be formed in other various shapes than the L-shape.

The piston part 323 is located in the drinking water storage space 111 and is connected to communicate with the other end of the suction tube 321, sucking the additive through the suction tube 321 as the pumping button part 310 reciprocates and discharging the sucked additive to the discharge tube 322.

The piston part 323 is interlocked with the pumping button part 310 to ascend and descend by the reciprocating movement of the pumping button part 310. The piston part 323 includes a piston rod 3231, a piston housing 3232, and an elastic member 3233.

The upper portion of the piston rod 3231 is connected, in contact, with the pumping button part 310, and the lower portion of the piston rod 3231 is inserted into the internal space 3232a of the piston housing 322.

The piston rod 3231 has a flow path 3231a formed therein to allow the additive in the piston housing 322 to move during pumping.

The piston housing 3232 is installed so that the piston rod 3231 ascends or descends in the internal space 3232a and is connected to communicate with each of the suction tube 321 and the discharge tube 322.

The piston housing 3232 is located in the drinking water storage space 111 and communicates with the other end of the suction tube 321. The piston housing 3232 has the internal space 3232a where the piston rod 3231 moves up and down.

In the piston housing 3232, the additive in the additive storage space 201 is introduced into the internal space 3232a by a change in internal pressure according to the ascent and descent of the piston rod 3231.

The elastic member 3233 serves to provide a restoring force of the piston rod 3231 that is coupled with the piston rod 3231 to move up and down.

The elastic member 3233 may be formed of an elastic spring fitted over the outer circumferential surface of the piston rod 3231 and inserted into the piston housing 3232 as shown. However, this is merely an embodiment, and the elastic member 3233 may be configured in other various ways that may achieve the above object.

The opening/closing valve 324 is installed below the piston housing 3232 to which the suction tube 321 is connected, and serves to selectively open and close the suction tube 321 as the piston rod 3231 ascends or descends.

The opening/closing valve 324 may include a ball valve 3241 installed on a valve flow path that communicates with the internal space 3232a of the piston housing 3232 and the suction tube 321.

Here, the ball valve 3241 is configured to move according to the ascent or descent of the piston part 323 in the valve flowpath and to open and close the suction tube 321 and the valve flowpath by the ascent and descent.

The ball valve 3241 serves as a one-way damper selectively shielding the upper end of the suction tube 321, and when a suction force is generated in the piston housing 3232, the ball valve 3241 moves upward to open the suction tube 321 and, when a compression force is generated in the piston housing 3232, the ball valve 3241 moves downward to shield the upper end of the suction tube 321.

The ball valve 3241 may be formed of a spherical, hard ball of metal, ceramic, or synthetic resin.

Although in the embodiment described above, the tumbler for beverage making is configured to supply the additive to the drinking water storage space 111 as the user manually pressurizes the pumping unit 300 and pumps the additive, another embodiment may also be possible in which the additive is pumped using a suction motor.

This is described. The tumbler for beverage making may include a pumping unit including a pumping motor (not shown). In this case, the pumping unit may include a suction tube having a first side extending to the inside of the additive tray and a second side disposed inside the drinking water storage space, a suction motor connected with the suction tube, a switch unit operating the suction motor and exposed to the outside of the drinking water tray to be operated by the user, and a discharge tube connected with the suction motor to discharge the additive to the drinking storage space.

The airtight means 330 is coupled to the pumping button part 310 to partition the pumping button part 310 from the drinking water storage space 111 to maintain airtightness and shields the pumping button part 310 from the drinking water storage space 111.

The airtight means 330 is formed in a cylindrical tube shape with an open upper portion and a closed lower portion, and the stem part 311 of the pumping button part 310 is inserted along the inner surface of the airtight means 330 to surround the lower side surface of the stem part 311, and the lower surface of the stem part 311 contacts the internal bottom of the airtight means 330, and the outer bottom of the airtight means 330 contacts the upper end of the pumping part 320.

The airtight means 330 maintains airtightness between the inner surface of the insertion hole 129 and the outer surface of the stem part 311, preventing leakage of the beverage or drinking water prepared in the drinking water storage space 111 through the insertion hole 129.

A bellows which has multiple pleats along the outer circumferential surface to be extended or contracted in the upper and lower directions with respect to the stem part 311 sliding up and down may be adopted as the airtight means 330.

Meanwhile, in the drawings, reference numerals 126 and 127 denote O-ring-shaped packings, and reference numeral 128 denotes a pad that is coupled to the lower portion of the additive tray 200 to prevent slips.

According to the above, the airtight means 330 is configured to remain contacted when pumping is not performed and to be extended when pumping is performed by the user so that the stem part 311 moves down.

Figure 6:
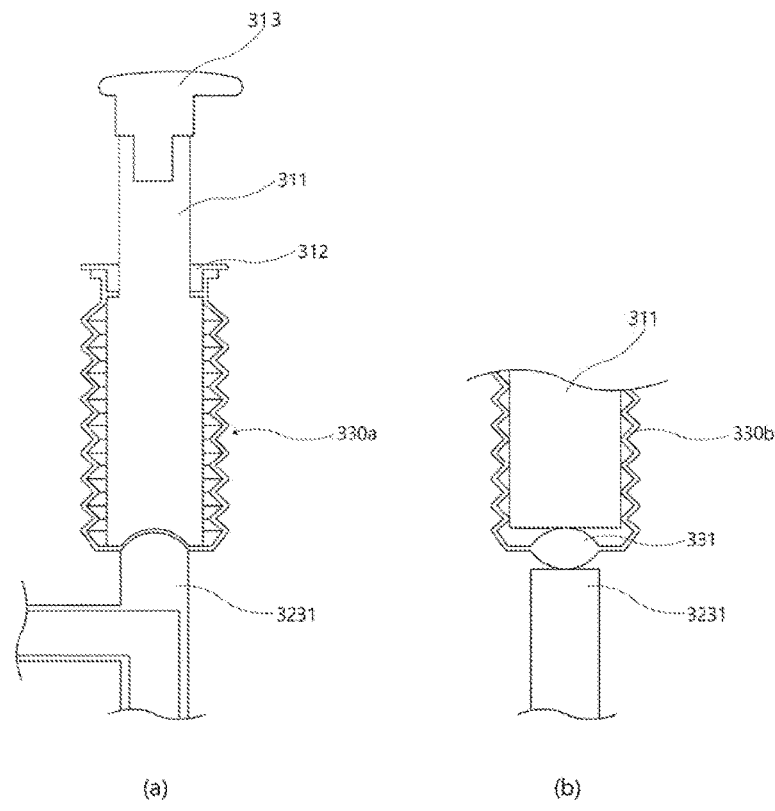
FIG. 6 is a front, cross-sectional view illustrating an airtight means of a pumping button part in the beverage making tumbler of FIG. 4.

FIG. 6 is a view illustrating another embodiment of the airtight means 330a and 330b.

Referring to the drawings, the airtight means 330a may have a convex portion, protruding in one or more of the upward or downward direction, on the bottom surface, (a) illustrates an embodiment in which the lower surface of the airtight means 330a is convex upward.

Meanwhile, the airtight means 330b may have a convex portion 331 protruding upward and downward, as illustrated in (b).

In this case, since the airtight means 330b may reduce the contact area with the upper end of the stem part 311 or the piston rod 3231, preventing damage due to, e.g., contact friction.

In other words, in the case where the upper tray 120 and the lower tray 110 are assembled and coupled together by screwing, when the upper tray 120 is assembled to the lower tray 110 by screwing, with the pumping button part 310 inserted into the insertion hole 129 of the upper tray 120, friction occurs while the lower end of the airtight member 330 rotates and contacts the upper end of the piston rod 3231 during the assembly process and the friction may lead to damage to the lower end of the airtight means 330b.

Therefore, the convex portion 331 formed on the lower surface of the airtight means 330b may minimize the contact area with the upper surface of the piston rod 3231, thereby reducing the frictional force due to rotational contact during assembly, and thus effectively preventing damage to the airtight means 330b.

The airtight means 330, 330a, or 330b may be formed of an elastic material such as rubber or silicone to and, when pumping, the airtight means 330, 330a, or 330b may be compressed between the stem part 311 and the piston rod 3231 to increase the contact area. Therefore, when pumping, the descending movement force of the stem part 311 may be more effectively transmitted to the piston rod 3231.

As described above, the airtight means 330, 330a, or 330b may be formed in a cup shape to surround the lower side surface including the outer circumferential surface and lower surface of the stem part 311 in the drinking water storage space 111, but not in the conventional O-ring shape, while partitioning the pumping button part 310 and the pumping part 320, thus allowing for a more effective sealing of the insertion hole through which the pumping button part 310 is inserted and thus securing airtightness of the insertion hole 129. Therefore, the airtight means may effectively prevent the drinking water or beverage in the drinking water storage space 111 from leaking out through the insertion hole 129 while in use, thus leading to better usability and hygiene.

As the tumbler for beverage making supplies the additive to the drinking water storage space 111 by pumping the additive in the additive through the pumping unit 300, a negative pressure is formed in the additive storage space 201, disturbing the pumping of the additive and, as a result, the amount of the additive flowing out per pumping reduces and becomes non-uniform, rendering it difficult to make a proper amount of mixed beverage. Further, upon replacing the additive tray 200, it may be hard to open due to the internal pressure of the additive storage space 201.

For this reason, the tumbler for beverage making may include an air introduction means 140 that introduces external air into the additive storage space 201 to release the negative pressure (vacuum pressure) formed therein during pumping, thereby smoothing the pumping, keeping the amount of additive flowing out constant, and facilitating opening of the additive tray 200.

The air introduction means 140 is configured so that the inside and outside of the additive tray 200 communicate with each other and the air outside the additive tray 200 is selectively introduced to the inside of the additive tray selectively depending on the difference in atmospheric pressure between the inside and outside of the additive tray 200.

Figure 7:
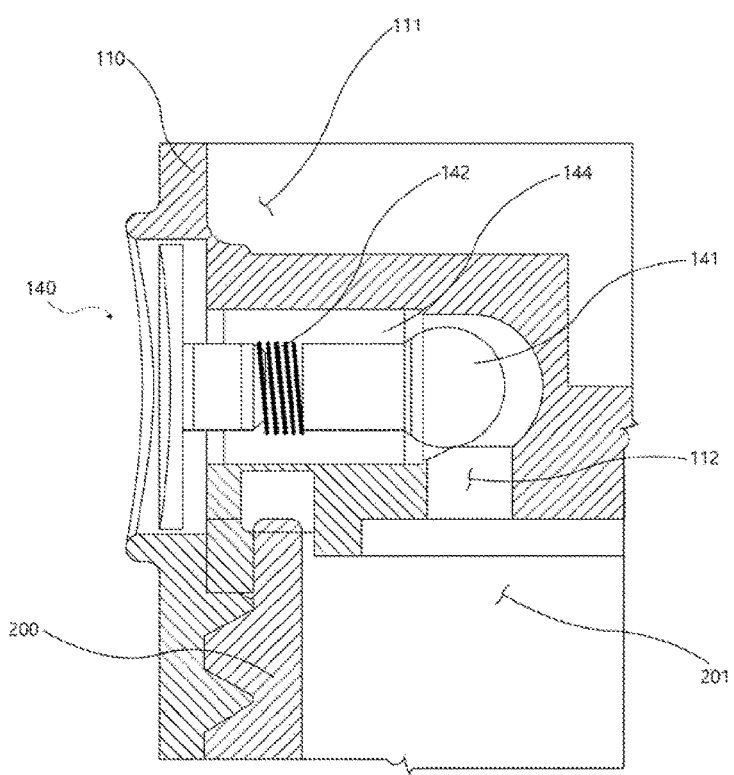
FIG. 7 is a front, cross-sectional view illustrating a configuration of an air introduction means in the tumbler for beverage making of FIG. 4.

Referring to FIG. 7, the air introduction means 140 is installed on an air introduction passage 112 to selectively open or close the air introduction passage 112 by an external force, e.g., the user's manipulation or the difference in pressure from the outside, allowing the air to flow into the additive storage space 201.

The air introduction passage 112 is formed on the bottom surface of the lower tray 110 to allow the outside to communicate with the additive storage space 201.

The air introduction passage 112 has one end formed at an outer lower portion of the lower tray 110, along the thickness, not to communicate with drinking water storage 111 of the lower tray 110 and the other end positioned on the additive tray 200 so as to effectively prevent the additives in the additive storage space 201 from leaking out through the air introduction passage 112.

The air introduction means 140 may adopt a pressurized configuration to be opened and closed by an external force and a pressure responsive system to be opened and closed automatically by a pressure difference.

FIG. 7 shows the air introduction means 140 adopting such a pressurized configuration. The air introduction means 140 may include an introduction button body 141 and an elastic spring 142.

The introduction button body 141 is installed on the air introduction passage 112 and is reciprocated by external force (pressurization) to selectively open and close the air introduction passage 112.

The elastic spring 142 is installed in the introduction button body 141 to provide a restoring force to the introduction button body 141 in the direction of shielding the air introduction passage 112.

Additionally, the air introduction means 140 may further include a cylindrical fitting part 144 which is inserted and coupled into the air introduction passage 112 and through which the introduction button body 141 is inserted.

Accordingly, in the tumbler for beverage making, when a negative pressure is generated in the additive storage space 201 according to the repeated pumping or temperature of the hot additive, so that the amount of the additive flown out is uneven or it is difficult to open the additive tray 200, the user may open the air introduction passage 112 by pressing the introduction button body 141 in the state where the introduction button body 141 closes the air introduction passage 112 by the elastic spring 142 through the air introduction means 140, and external air may be introduced into the additive storage space 201 through the open air introduction passage 112 to thereby release the negative pressure of the additive storage space 201, facilitating to open the additive tray 200.

Figure 8:
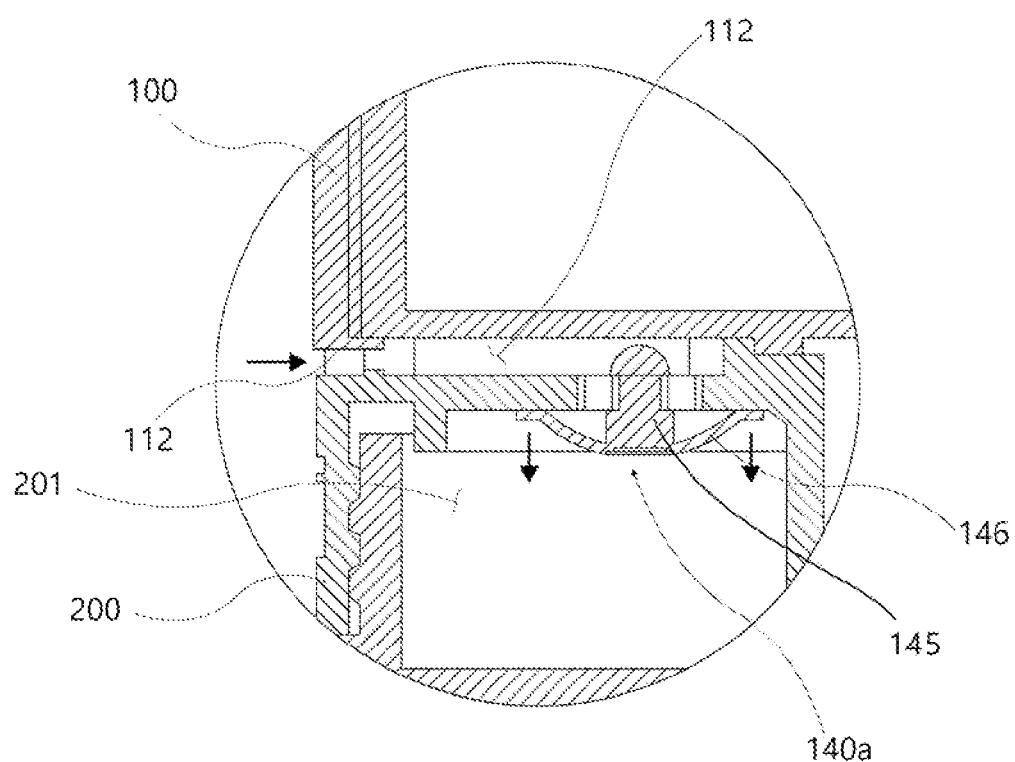
FIG. 8 is a view illustrating another embodiment of the air introduction means in the beverage making tumbler of FIG. 4.

Next, an air introduction means 140a adopting a pressure-responsive configuration will be described with reference to FIG. 8. The air introduction means 140a, unlike the above-described embodiment, is installed on the air introduction passage 112, is formed of an elastic material which may be elastically deformed by a pressure difference or external force to automatically open and close the air introduction passage 112 and thus allow the air to be introduced into the additive storage space 201.

Since the air introduction means 140a is configured such that its own material has an elastic restoring force, the above-described component, e.g., the elastic spring 142, may be omitted, thereby achieving a simpler configuration.

Referring to the drawings, the air introduction means 140a is configured of an elastic button that is formed of an elastic material and is elastically deformed by the difference in atmospheric pressure between inside and outside of the additive tray 500 to thereby automatically open and close the air introduction passage 112. The air introduction means 140a is installed in the air introduction passage 112.

The air introduction passage 112 is formed on the bottom of the lower tray 110 and communicates with the additive storage space 201, and may be installed at the end of the air introduction passage 112 in the additive storage space 201.

Specifically, the elastic button may include a button body 145 and a pad 146 coupled to the button body 145.

The button body 145 is inserted into the air introduction passage 112 from the additive storage space 201 side, and is configured to form a space spaced apart from the inner wall surface of the air introduction passage 112 so that air enters or exits the outer circumferential surface.

The pad 146 is coupled along the outer circumferential surface of the button body 145 and is spaced apart from the outer circumferential surface of the button body 145 to cover the spaced space through which air flows.

The pad 146 is formed to be deformed according to the pressure difference (in the direction of the arrow), so that the air introduction passage 112 may be automatically opened when a pressure difference between the additive storage space 201 and the outside occurs.

The operation of the air introduction means 140a will be described.

First, the air introduction means 140a is configured so that when there is no or little difference in atmospheric pressure between inside and outside of the additive tray 500, the pad 146 tightly contacts the inner surface of the additive tray 200 to shield the air introduction passage 112 and prevent leakage of the additive from the additive tray 20.

Then, when the pressure inside the additive storage space 201 is lowered due to the operation of the pumping button part 310, and a pressure difference from the outside occurs, the pad 146 is elastically deformed in the direction of the arm open the air introduction passage 112, as shown, so that external air is introduced into the additive tray storage space 201 through the opened air introduction passage 112.

As described above, since the air introduction means 140a is installed in the storage space 201 inside the additive tray 200, it is configured not to be visible to the naked eye from the outside, thereby improving the aesthetics of the beverage manufacturing tumbler.

Hereinafter, the operation of the tumbler for beverage making, including sucking and discharging the additive, is described.

First, if the user presses down the pumping button part 310, with the drinking water a 100 and additive tray 200 filled with liquid drinking water and an additive, respectively, and the piston housing 322 filled with the additive, the piston part 323 is moved down accordingly.

Then, the piston rod 3231 in the piston housing 3232 moves downward, so that the pressure inside the piston housing 3232 increases.

When the pressure in the piston housing 3232 increases, the ball valve 3241 moves downward, thereby shielding the upper end of the suction tube 321.

The additive in the piston housing 3232 is introduced into the drinking water storage space 111 through the flow path 3231a of the piston rod 3231 and the discharge tube 322.

That is, as described above, when the user moves the pumping button part 310 downward, the suction of the additive is shielded by the ball valve 3241, and the additive in the piston housing 3232 is injected to the drinking water storage space 111.

On the other hand, when the user releases the pressure applied to the pumping button part 310 in the above-described state, the piston part 323 is restored and moved upward by the elastic member 3233. Then, as the piston part 323 moves upward and the piston rod 3231 moves upward, the pressure in the piston housing 3232 is changed to a low pressure.

As the ball valve 3241 moves upward, the upper end of the suction tube 321 is open, the additive of the additive storage space 201 moves along the suction tube 321 and enters the piston housing 3232, filling the piston housing 3232.

As described above, the user may inject a constant amount of additive from the additive tray 200 to the drinking water tray 100 by repeatedly pressing the pumping button part 310 via the pumping unit 300.

Such a pumping operation of the user allows a constant amount of additive to be injected into the drinking water storage space 111 by the pressure in the piston housing 3232 according to the movement of the piston rod 3231, and the amount of the additive injected may be varied depending on the volume of the internal space 3232a of the piston housing 3232 and the pressure according to the distance in which the piston rod 3231 moves up and down.

Figure 9:
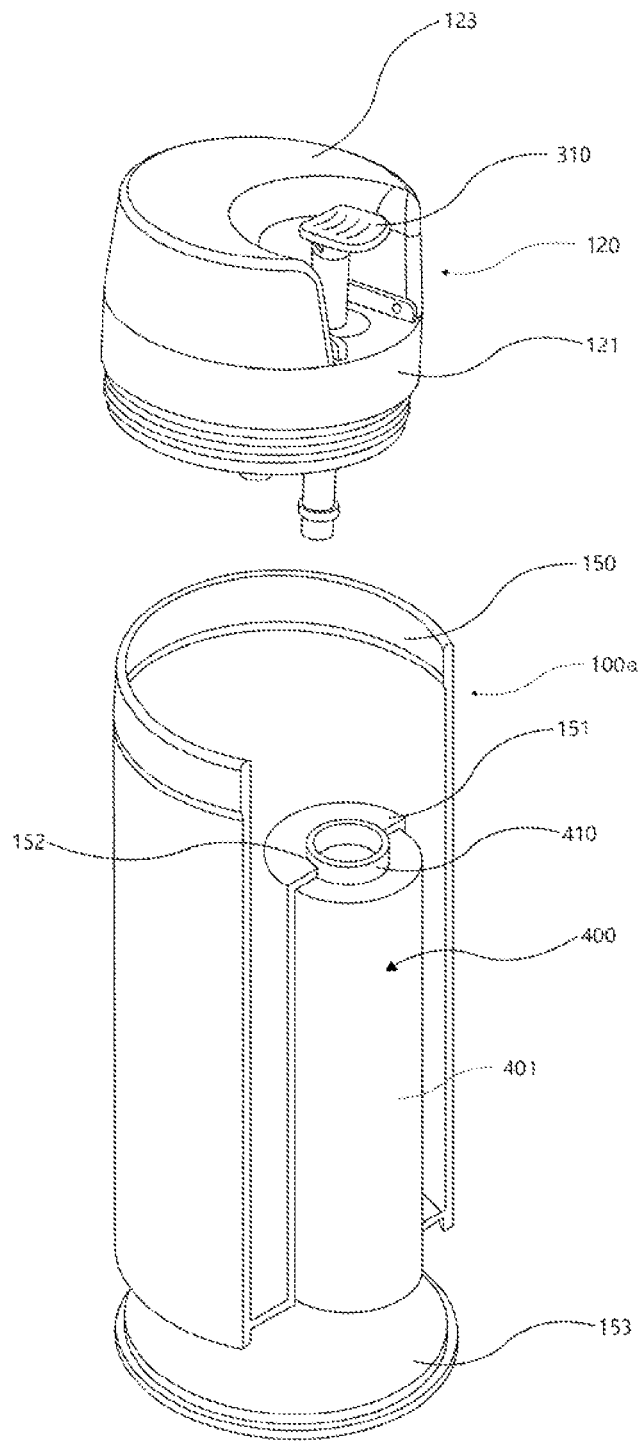
FIG. 9 is a perspective view illustrating another embodiment of an additive tray in the beverage making tumbler of FIG. 4.
Figure 10:
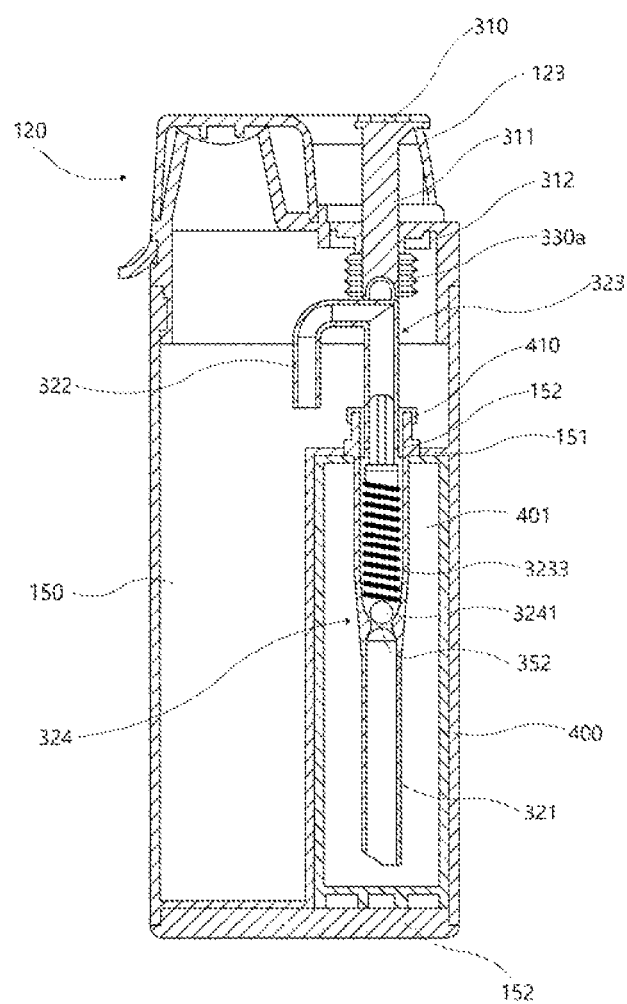
FIG. 10 is a front, cross-sectional view illustrating an internal structure of the tumbler for beverage of FIG. 9.

FIG. 9 is a perspective view illustrating another embodiment of the additive tray 400 in the beverage manufacturing tumbler of FIG. 4, and FIG. 10 is a front cross-sectional view illustrating the internal structure of the beverage manufacturing tumbler of FIG. 9, The following description focuses only on components different from those of the above-described tumbler for beverage making.

Referring to the drawings, the additive tray 400 may be detachably coupled to the lower portion of the drinking water tray 100 as described above, but the additive tray 400 may be positioned on a side of the drinking water tray 100a as illustrated in FIGS. 9 and 10 so as to be detachably coupled to the side of the drinking water ray 100a.

To this end, the lower tray 150 has a guide body 151 on its side. The guide body 151 is formed in the drinking water storage space 111 along the vertical, longitudinal direction and has a cylindrical coupling space formed along the longitudinal direction, and the upper central portion thereof has a coupling hole 152 through which the protruding tube part 410 of the additive tray 400 is inserted.

The protruding tube part 410 extends to protrude along the upper outside of the additive tray 400 and is shaped as a hollow tube through which the pumping unit 300 is inserted.

The additive tray 400 is formed to allow the protruding tube part 410 to penetrate and protrude from the top thereof, has an additive storage space 401 formed therein, and is erect and detachably coupled to the coupling space.

In the tumbler for beverage making, the drinking water tray 100a and the additive tray 400 are configured so that the protruding tube part 410 is detachably coupled to the coupling hole 152 in a snap manner, and a support 153 is coupled to the bottom of the lower tray 150 to support the lower tray 150 and the additive tray 400 and the additive tray 400 upward.

Figure 11:
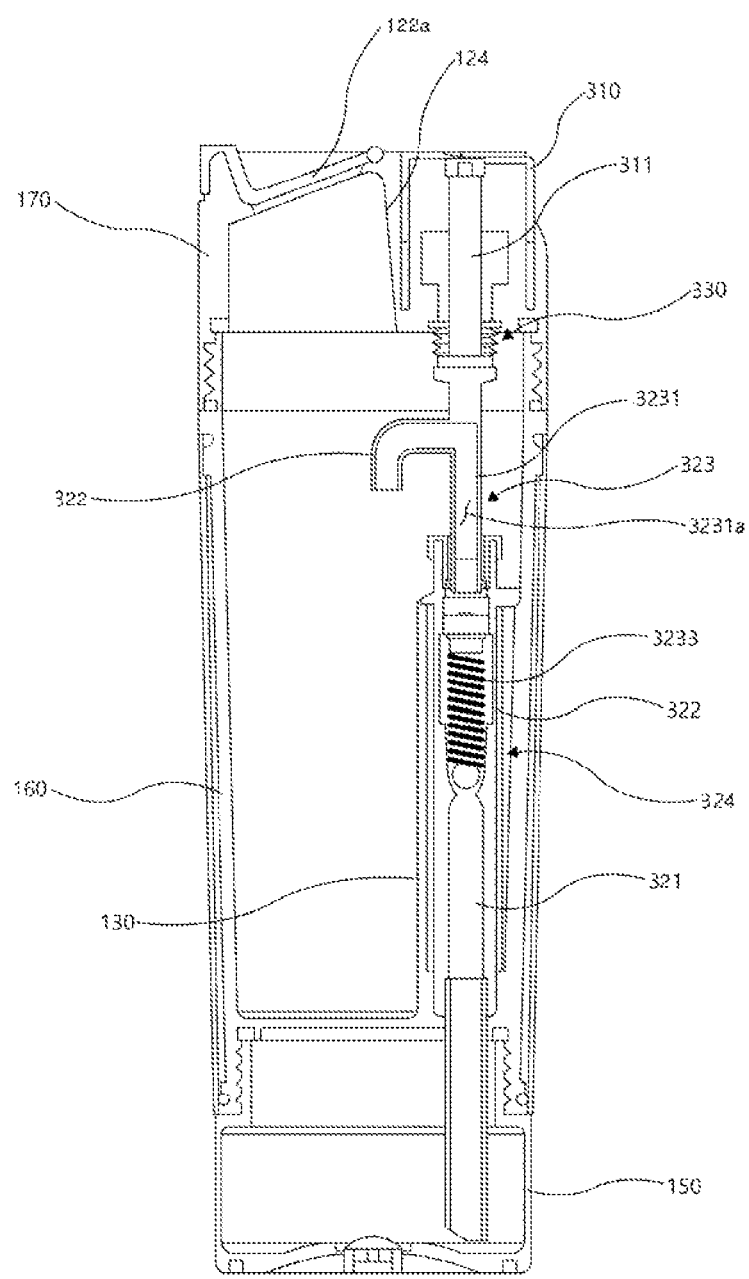
FIG. 11 is a front, cross-sectional view illustrating another embodiment in which a coupling part is formed in a drinking water tray in the tumbler for beverage making of FIG. 4.

FIG. 11 is a front cross-sectional view illustrating another embodiment in which a guide tube 130 is formed in the drinking water tray 100 in the beverage manufacturing tumbler of FIG. 4. The following description focuses only on components different from those of the beverage manufacturing tumbler of FIG. 4.

Referring to the drawings, the lower tray 160 may be configured to further include a guide tube 130 which is located in the drinking water storage space 111 and into which the pumping unit 300 is inserted.

The guide tube 130 is configured to extend upward from the through-hole 114 to the inside of the drinking water storage space 111, and has a tubular shape into which the pumping unit 300 is inserted.

That is, the guide tube 130 is configured such that the pumping button part 310, the piston part 323, and the upper portion of the suction tube 321 are inserted into the inside, thereby preventing the components inserted therein from shaking and the additive from leaking from the through-hole 114 to the drinking water storage space 111.

Meanwhile, in the drawings, reference numeral 170 denotes an upper tray, and 122*a* denotes a cap part coupled to the upper tray 170.

The tumbler for beverage making may be formed of a variety of materials such as polypropylene (PP), Tritan, silicone, polyethylene, PET, etc., which is easy to manufacture and resistant to heat.

Figure 12:
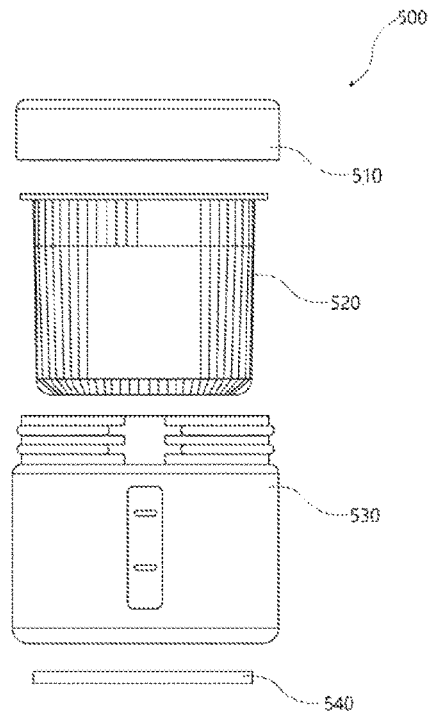
FIG. 12 is a view illustrating another embodiment of the additive tray in the tumbler for beverage making according to an embodiment of the present invention.

FIG. 12 is a view illustrating another embodiment of the additive tray 500 in the beverage manufacturing tumbler. Referring to the drawings, the additive tray 500 is an embodiment using an additive capsule 520 in which an additive is stored, and the additive capsule 520 in which the additive is stored is configured in such a manner that the capsule is received in the additive tray 500.

In this case, the additive tray 500 is configured so that an additive capsule 520 containing an additive, which is purchased from the manufacturer, is put in the additive storage space 201, rather than inserting the stock solution of the additive, thus adding convenience.

The additive tray 500 is described in detail. The additive tray 500 includes an additive tray upper body 510, an additive tray lower body 530 screwed with the additive tray upper body 510 and having an additive storage space 201 formed therein, an additive capsule 520 put in the storage space of the additive tray lower body 530 and containing an additive, and an anti-slip pad 540 coupled to the portion of the additive tray lower body 530.

The additive capsule 520 has a cup shape as shown. The additive capsule 520 may be shaped and sized to be inserted into the storage space of the additive tray lower body 530, and the upper opening thereof, although not shown, may be shielded by a shielding member formed of vinyl to prevent leakage of the received additive when carried.

The tumbler for beverage making may be equipped with a short-range wireless communication (near field communication (NFC)) function for providing various information to the user.

That is, the beverage manufacturing tumbler may be configured so that a short-range wireless communication component s installed in the drinking water tray 100 or the additive tray 200, 400, or 500 to be able to detect various information according to the use of the beverage manufacturing tumbler, and the detected information may be transmitted to the user's portable terminal on which a designated application has been installed, providing the user with various information.

Here, as the short-range wireless communication component, various components, such as a known NEC chip or NEC card, may be adopted, no detailed description of which is given.

Further, the use of information using short-range wireless communication allows the NFC component to detect various information according to the use of the tumbler for beverage making, such as the date, the type of additive, the containing capacity of additive, and the cumulative amount of the additive, thereby providing the user with the user's health management information, such as the amount of ingestion. However, this is merely an example, and it may be configured to provide other various pieces of information.

Hereinafter, other embodiments of the tumbler for producing a beverage will be described in detail.

Figure 13:
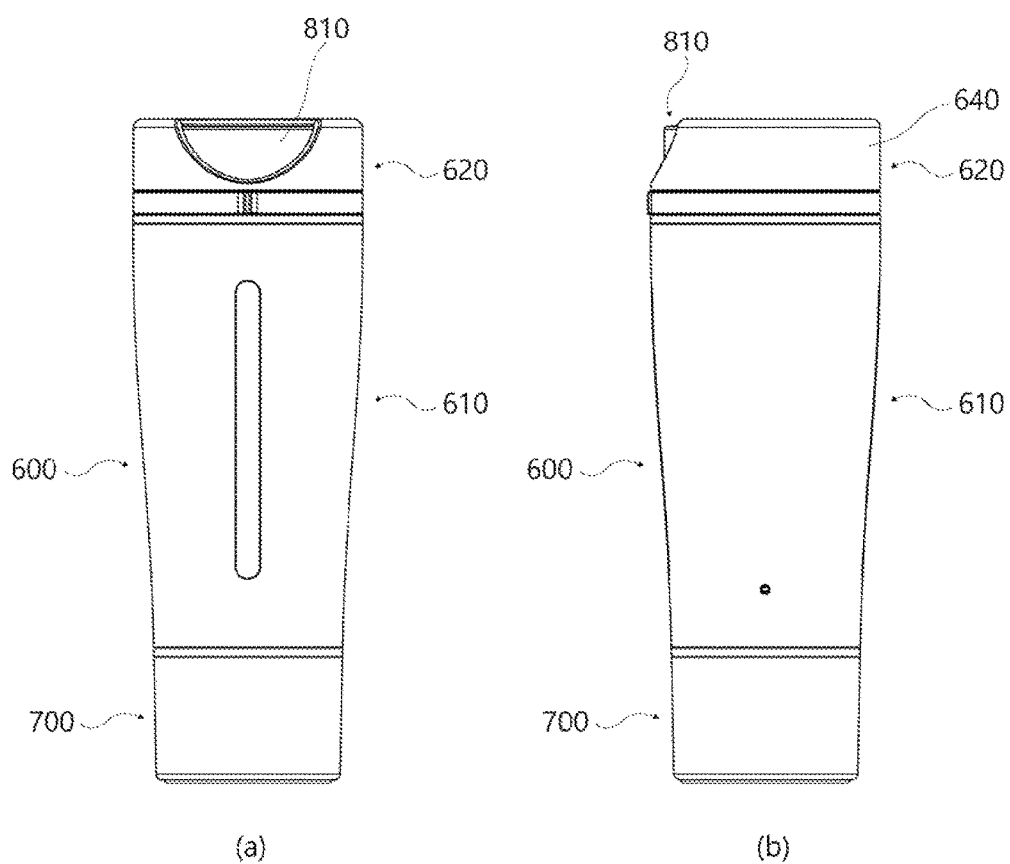
FIG. 13 illustrates a front view and a right side view of a tumbler for beverage making according to another embodiment of the present invention.
Figure 14:
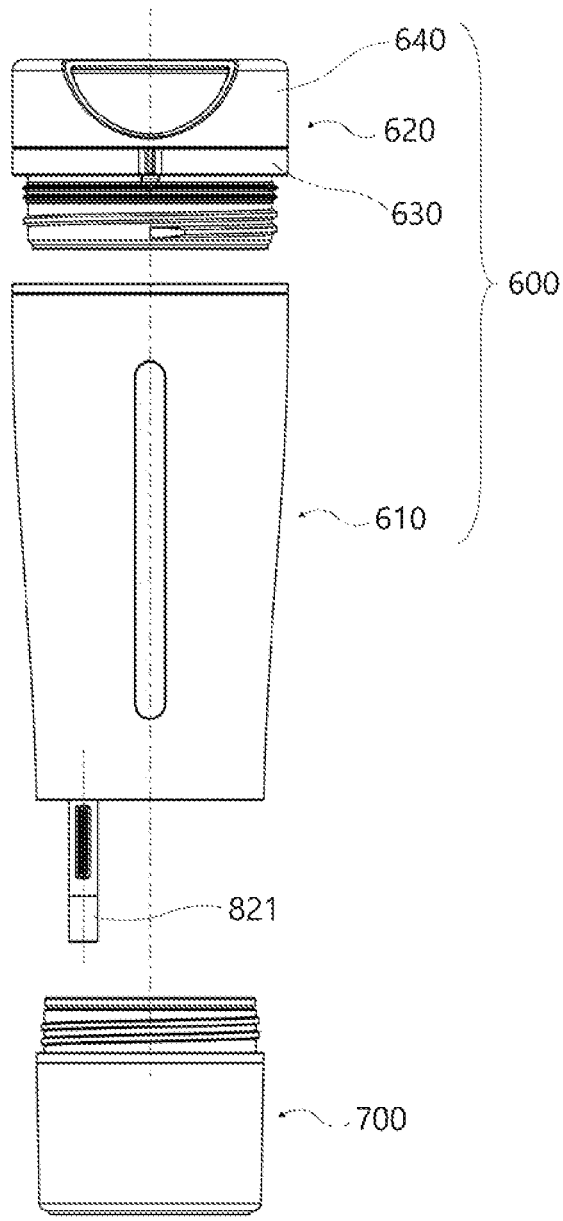
FIG. 14 is an exploded view of the tumbler for beverage making of FIG. 13.

First, referring to FIGS. 13 and 14, the tumbler for beverage making according to an embodiment of the present invention may include a drinking water tray 600, an additive tray 700 coupled to a lower portion of the drinking water tray 600, and a pumping unit 800 (see FIG. 15) coupled to the drinking water tray 600 and the additive tray 700.

Figure 15:
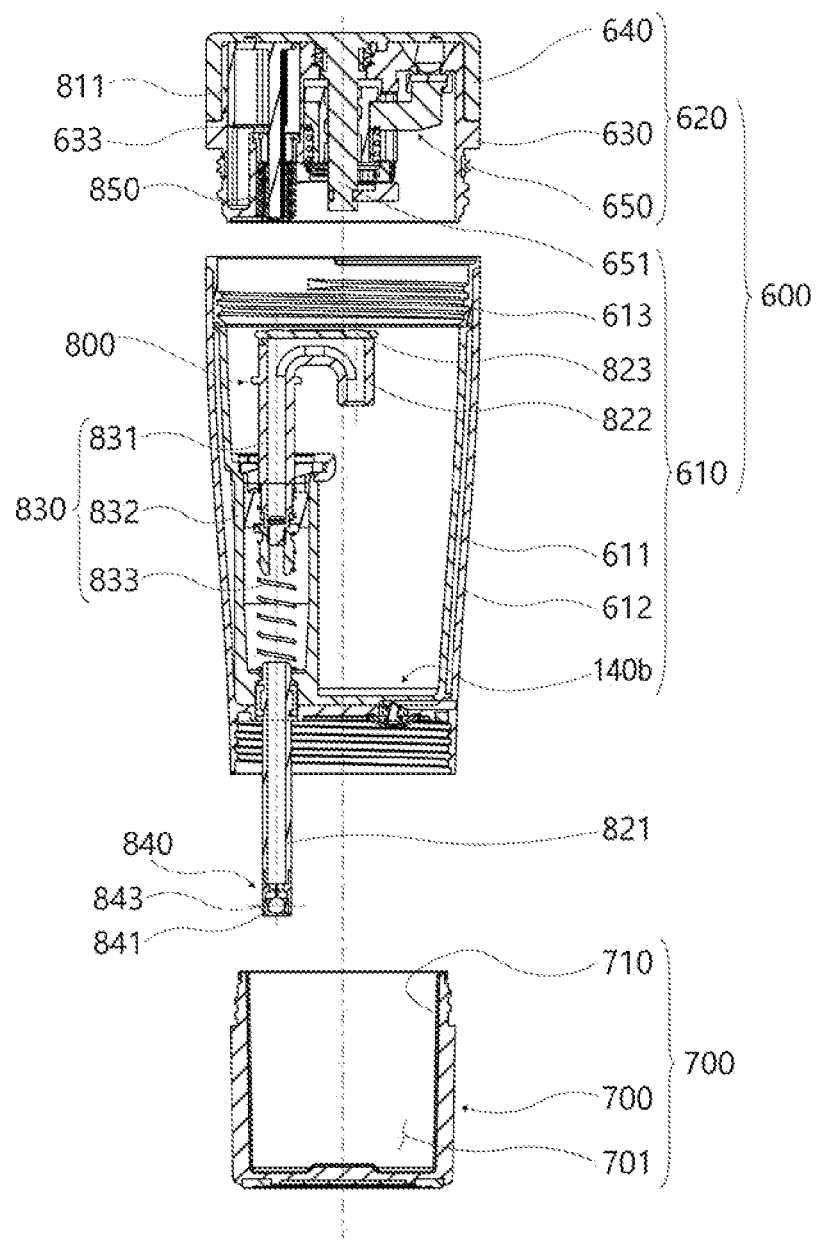
FIG. 15 is a cross-sectional view illustrating an internal structure of the tumbler for beverage making of FIG. 14.

Referring to FIG. 15, the drinking water tray 600 is a portion constituting the body of the cylindrical tumbler, and a drinking water storage space 614 is formed therein to store drinking water or beverages.

The drinking water tray 600 may include a lower tray 610 and an upper tray 620.

The lower tray 610 has an open top and a closed bottom and includes a drinking water storage space 614 formed thereinside to store drinking water or a beverage. A through-hole 615 is formed in the bottom of the lower tray 610 to allow the pumping unit 800 to be inserted therethrough.

Here, the through-hole 615 is formed to be adjacent to the inner circumferential side of the upper tray 620, off the center of the upper tray 620 when viewed in plan view, so that the pumping unit 800 may be installed to be adjacent to the inner surface of the additive tray 700 and the drinking water tray 600.

The upper tray 620 is detachably coupled to the upper portion of the lower tray 610 to shield the open upper portion of the lower tray 610. The upper tray 620 has a mouthpiece 632 for the user to drink drinking water or beverage in the drinking water storage space 614.

Specifically, the upper tray 620 may include a closure part 630, a rotary closing part 640, and a shielding module 650.

The closure part 630 is detachably coupled to the lower tray 610, and a mouthpiece 632 is formed through the upper surface thereof so that the user may drink the stored beverage. The pumping unit 800 is installed through an installation hole 631 to be spaced apart from the mouthpiece 632 on an upper surface of the closure part 630.

Although the drawings show that the closure part 630 is detachably coupled with the lower tray 610 through screwing, this is merely an embodiment. Other various methods, such as snap coupling or button-type coupling, than screwing may be applied which may enable a coupling and decoupling and maintain airtightness.

The rotary closing part 640 is rotatably coupled to an upper portion of the closure part 630 and is configured to rotate around a rotating shaft 651 formed in an inner center of the lower end when an external force (the user's manipulation) is generated.

The rotary closing part 640 has an opening 641 to expose the upper portion of the closure part 630, and the rotary closing part 640 is configured to expose the mouthpiece 632 and the pumping unit 800 as rotated through the opening 641.

The drawing illustrates an embodiment in which the rotary closing part 640 is shaped as a cup with an open bottom and is rotatably coupled to the closure part 630, with the lower inner surface and the upper surface of the closure part 630 in contact with each other.

The upper tray 620 may be classified into a storage mode, a drinking mode, and a pumping mode according to the relative rotation positions of the closure part 630 and the rotary closing part 640.

First, in the storage mode, the mouthpiece 632 and the pumping unit 800 are shielded to shield the user from drinking the drinking water or beverage and operating the pumping unit 800, and the mouthpiece 632 is shielded by the shielding module 650.

In the drinking mode, the mouthpiece 632 is opened by the opening 641 to allow the user to drink the drinking water or beverage through the mouthpiece 632. The pumping unit 800 is shielded.

Finally, in the pumping mode, the mouthpiece 632 is shielded by the opening 64*l* and the pumping unit 800 is opened, allowing the user to operate the pumping unit 800. In this case, the mouthpiece 632 is shielded by the shielding module 650.

The upper tray 620 may switch between the storage mode, drinking mode, and pumping mode, e.g., sequentially from the drinking mode to the storage mode and the pumping mode as it rotates clockwise, or sequentially from the pumping mode to the storage mode and the drinking mode as it rotates counterclockwise.

Figure 20:
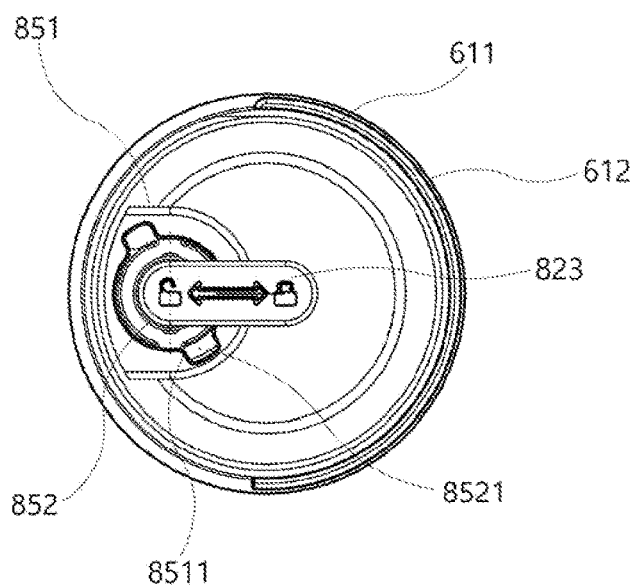
FIG. 20 is a plan view illustrating a sliding opening/closing part of a pumping part in the tumbler for beverage making of FIG. 15.
Figure 21:
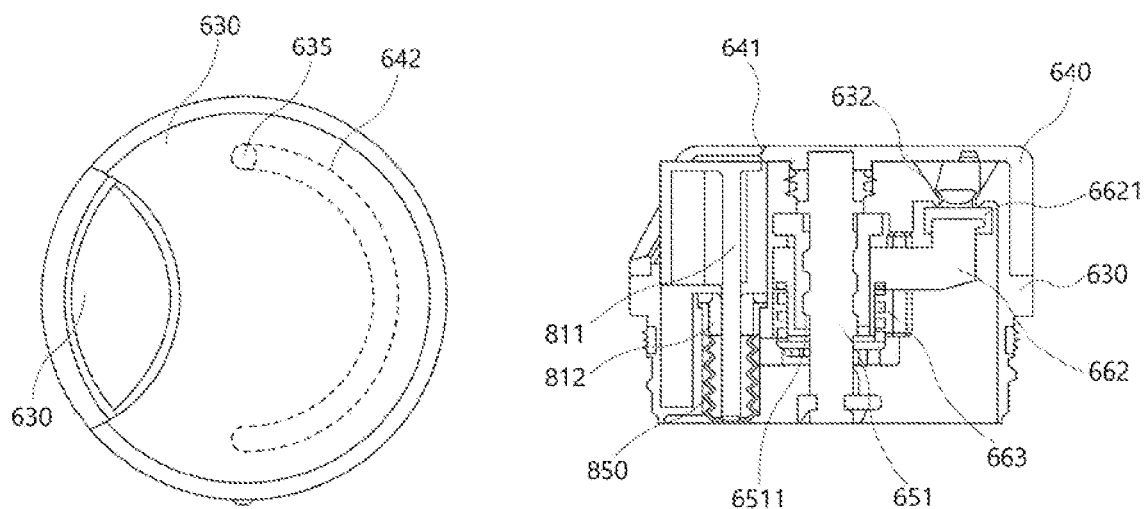
FIG. 21 illustrates a plan view and a front cross-sectional view of a configuration of an upper tray in a pumping mode in the tumbler for beverage making of FIG. 13.
Figure 22:
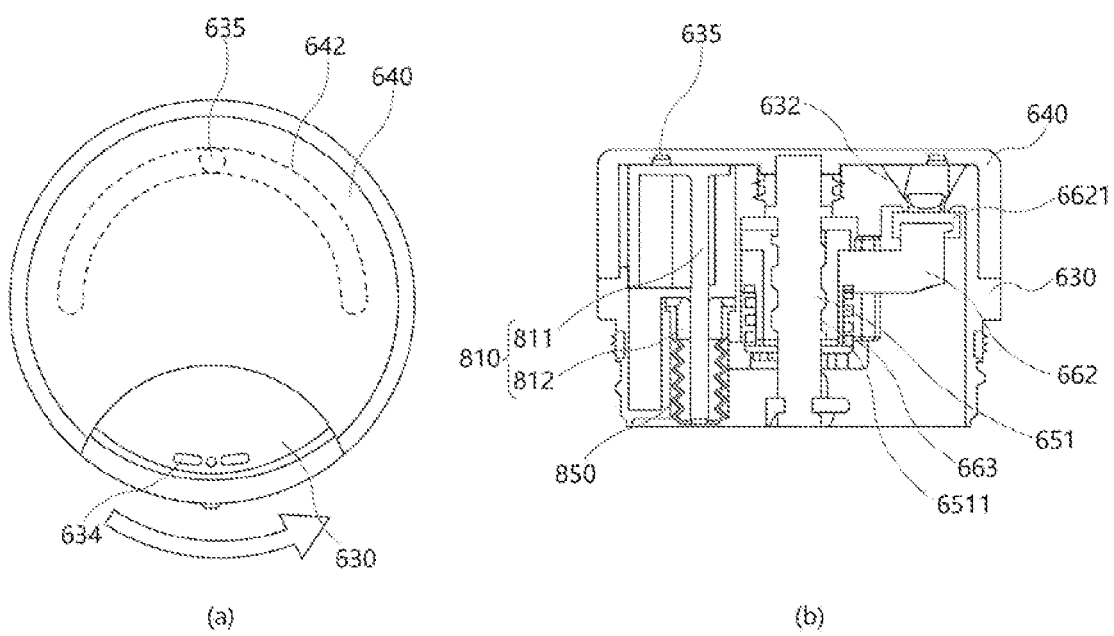
FIG. 22 illustrates a plan view and a front cross-sectional view of a configuration of an upper tray in a storage mode in the tumbler for beverage making of FIG. 13.

Although FIGS. 20 to 22 illustrate an embodiment in which the upper tray 620 becomes the storage mode when rotated counterclockwise by 90° from the pumping mode and becomes the drinking mode when rotated counterclockwise by 90° from the storage mode, this is merely an embodiment. Each mode may be configured in other various manners in relative rotational positions of the closure part 630 and the rotary closing part 640.

A detailed description of each mode of the upper tray 620 will be described below in connection with each mode according to the position of the rotary closing part 640 and the operation of the shielding module 650 according thereto.

The shielding module 650 is located under the closure part 630, the upper portion thereof is fixed to the rotary closing part 640, and is rotated, and moved along the axial direction of the rotary closing part 640, by the rotation of the rotary closing part 640 so as to open and close the mouthpiece 632 when the rotary closing part 640 is rotated.

Figure 16:
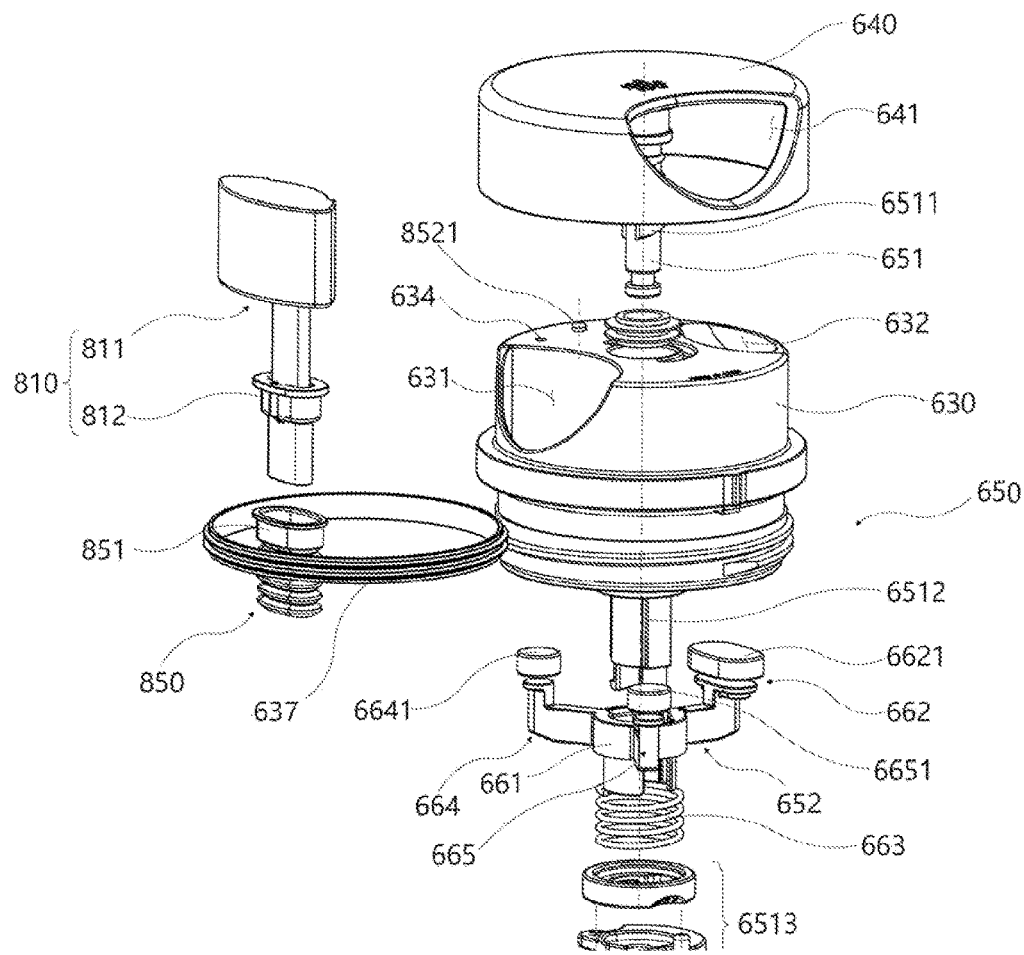
FIG. 16 is an exploded perspective view illustrating a configuration of an upper tray in the beverage making tumbler of FIG. 15.

Referring to FIG. 16, the shielding module 650 may include a shielding support 652 and an elastic member 663.

In this case, the shielding support 652 may include a rotation shaft part 6512, a support body 661, and a shielding part 662, and may further include an air shielding part 664 and a balance support part 665.

The shielding support part 652 is axially coupled to the rotation shaft 651 to open and close the mouthpiece 632 by rotation of the rotary closing part 640, and moves up and down with respect to the rotational motion of the rotary closing part 640 to shield the mouthpiece 632.

First, the rotation shaft part 6512 is configured such that the rotation shaft 651 fixedly coupled to the rotation closing part 640 is inserted thereinside and coupled thereto, and moves up and down along the rotation shaft 651.

To this end, the rotation shaft 651 has a threaded portion formed along an outer circumferential surface thereof, and the rotation shaft part 6512 has a cam screw (not shown), engaged with the threaded portion, formed on the inner circumferential surface of an insertion hole through which the rotation shaft 651 is inserted. As the rotation shaft 651 rotates, the rotation shaft part 6512 ascends or descends.

In the storage mode and pumping mode according to the present invention, the state in which the mouthpiece and the air hole are shielded need be maintained and, in the drinking mode, the mouthpiece and the air hole need to be open.

To that end, in the present invention, as large a space between the rotation shaft part 6512 and the shielding part 662 as the screw pitch value of the rotation shaft 651 corresponding to the angle value (e.g., +22.5 degrees) of the pumping mode and the storage mode may be provided, so that the shielding module 650 may maintain airtightness even in the pumping mode and the storage mode (e.g., +22.5 degrees) even when the rotary closing part 640 is rotated.

The rotation of the rotation shaft 651 for each mode and the resultant specific operation of the shielding module 650 are described below.

Described above is an embodiment in which the shielding module 650 includes the shielding support 652 and the elastic member 663. However, this is merely an embodiment, and unlike in the above-described embodiment, the shielding module 650 may be composed of the shielding support 652 alone, without the elastic member 663.

This is described. In the case of the above-described embodiment, the shielding support 652 divides the cam screw into a horizontal section and an inclined section and switches to the storage mode and pumping mode to keep the mouthpiece and the air hole in the shielded state in the horizontal section while switching to the drinking mode to turn the mouthpiece and the air hole to the open state in the inclined state.

That is, in correspondence with the elevating position of the shielding support 652, the cam screw is formed as a horizontal cam so that the shielding support 652 is maintained in an elevated state between the pumping mode and the storage mode, and the cam screw may be formed as an inclined cam so that the shielding support 652 may descend between the storage mode and the drinking mode.

The support body 661 is configured to allow the rotation shaft part 6512 to be rotatably inserted thereinto and to descend in interlocking with the rotation shaft part 6512, and its elevation is supported by the elastic member 663.

The shielding part 662 is configured such that one end thereof is coupled to the outer surface of the support body 661 and the other end thereof extends from the one end to open and close the mouthpiece 632.

The air shielding part 664 is coupled to protrude from the outer surface of the support body 661 and extends to open and close the air hole 634 formed in the closure part 630 by rotation of the rotation shaft part 6512.

The balance support part 665 is coupled to protrude from the outer surface of the support body 661 between the shielding part 662 and the air shielding part 664, preventing eccentricity with the shielding part 662 and the air shielding part 664 with respect to the rotation shaft part 6512.

The elastic member 663 is coupled to the shielding support part 652 and elastically supports the shielding support part 652 upward. Specifically, the elastic member 663 supports the support body 661 and the shielding part 662 upward toward the rotary closing part 640 so that the packing 6221 of the shielding part 662 comes in tight contact with the mouthpiece 632, thereby securing airtightness.

The closure part 630 may have a guide slit that restricts the rotation of the shielding module 650 so that the shielding module 650 does not rotate but only moves up and down when the rotary closing part 640.

The guide slit has a cylindrical shape having an open bottom and a vertical slit. The shielding part 662, the air shielding part 6641, and the balance support part 6601 are inserted into the slit, guiding the shielding support 652 to move up or down along the slit while restricting the rotation.

Meanwhile, the upper tray 620 may have a guide groove 642 and an anti-rotation stopper protrusion 635 to guide the closure part 630 and the rotary closing part 640 to be located in preset relative positions in the pumping mode, drinking mode, and storage mode and to prevent excessive rotation of the rotary closing part 640.

The guide groove 642 is formed in the lower side surface of the rotary closing part 640 and is formed in an arc shape corresponding to a radius of rotation of the rotary closing part 640 for the drinking mode, the pumping mode, and the storage mode.

The stopper protrusion 635 is formed to protrude from the upper surface of the closure part 630 and fit into the guide groove 642, and is formed to be stuck to the inner surface of the guide groove 642 when rotating, restricting the rotation angle of the rotary closing part 640.

In the drawing, the guide groove 642 is formed in a semi-circular shape so that the rotation angle of the rotary closing part 640 becomes 180 degrees, corresponding to the rotation angle of the rotary closing part 640 for which the rotation angle is 90 degrees in all of the pumping mode, storage mode, and drinking mode. However, this is merely an embodiment, and a length may be set corresponding to the preset rotation angle of the rotary closing part 640.

Although not shown, there may be provided a configuration for seating the stopper protrusion 635 in the guide groove 642 to allow the user to identify, or to inform the user of, the position of the rotary closing part 640 in each mode. With this configuration, the rotary closing part 640 may form a wide guide groove 642 for each mode position and guide the stopper protrusion 635 to the seating position or may form a deep guide groove 642 and guide the stopper protrusion 635 to the seating position.

As described above, the guide groove 642 and the stopper protrusion 635 prevent excessive rotation of the rotary closing part 640, thereby preventing deformation of the elastic member 663 and damage to the shielding support 652. Further, the guide groove 642 and the stopper protrusion 635 prevent unintentional disassembly of the upper tray 620 and guides the rotary closing part 640 to stably rotate within the operating section.

Figure 17:
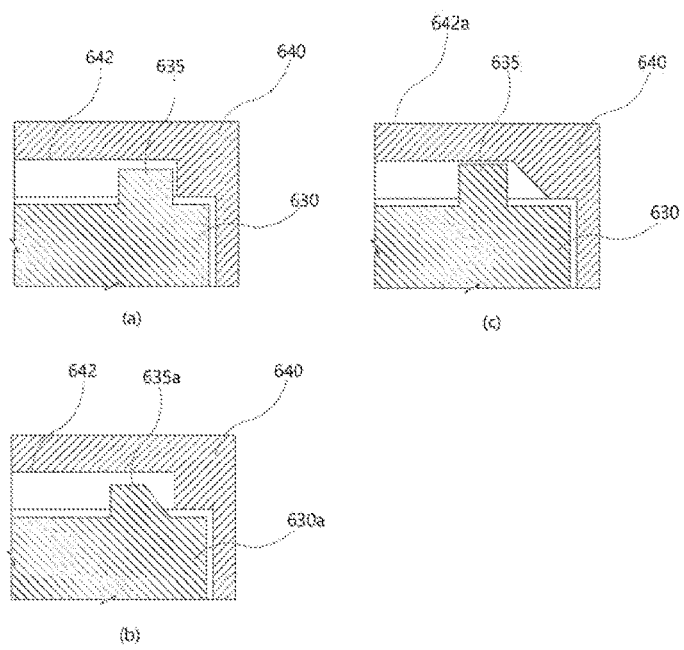
FIG. 17 is a front, cross-sectional view illustrating various embodiments of a stopper protrusion of a closure part and a guide groove of a rotary closing part in the tumbler for beverage making of FIG. 13.

Referring to FIG. 17, at least one of a side surface of the stopper protrusion 635 and an inner surface of the guide groove 642, which face each other, may have an inclined surface to reduce an external force by which the stopper protrusion 635 escapes off the guide groove 642.

The above-described inclined surface allows the stopper protrusion 635 to move beyond the guide groove 642 when a certain external force is applied so that the rotary closing part 640 may be easily separated from the closure part 630.

(a) FIG. 17 illustrates a case where no inclined surface is not formed, and (b) and (c) of FIG. 17 illustrate cases where an inclined surface is formed. Referring to this, an inclined surface may be formed in the stopper protrusion 635 as illustrated in (b), or may be formed in the guide groove 642 as illustrated in (c).

The inclined surface should not be formed in a direction in which excessive rotation of the rotary closing part 640 should be prevented, but should be formed in the opposite direction in hick disassembly is easy.

Figure 23:
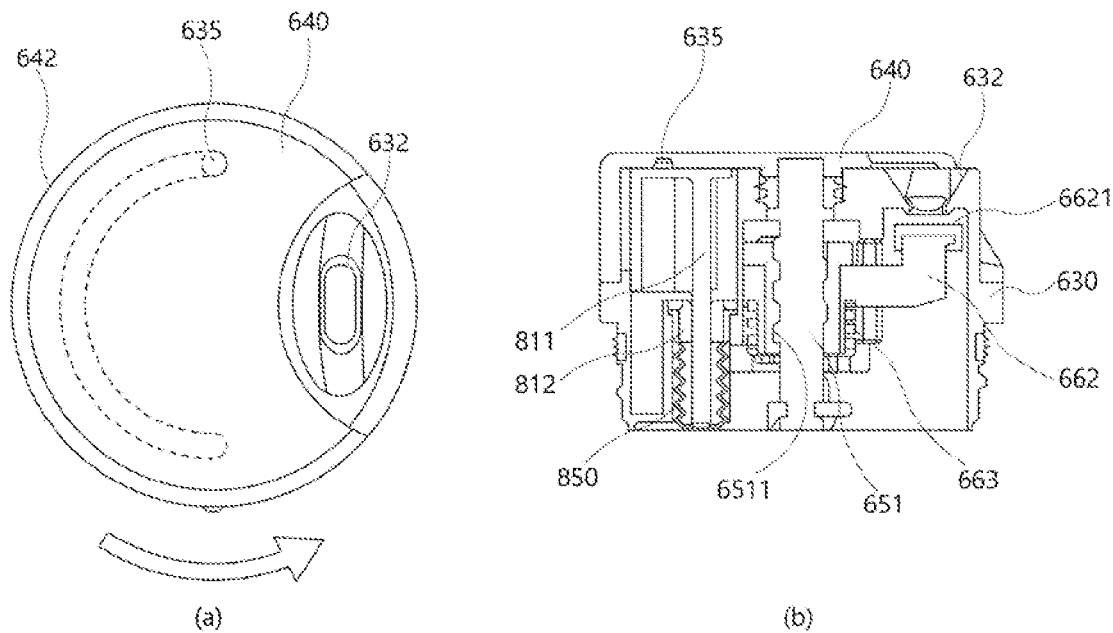
FIG. 23 illustrates a plan view and a front cross-sectional view of a configuration of an upper tray in a drinking mode in the tumbler for beverage making of FIG. 13.

Accordingly, when the pumping mode, the storage mode, and the drinking mode are sequentially switched as illustrated in FIGS. 21 to 23, the inclined surface is formed on one side surface of the stopper protrusion 635 and the guide groove 642 which contact each other in the pumping mode and, in the drinking mode of FIG. 23, a rectangular groove and protrusion which have a large degree of inclination, rather than an inclined surface, may be formed on the opposite side surface of the stopper protrusion 635 and the guide groove 642 which contact each other.

The lower tray 610 may be configured to secure warmth and heat insulation by forming an air layer therein.

Figure 18:
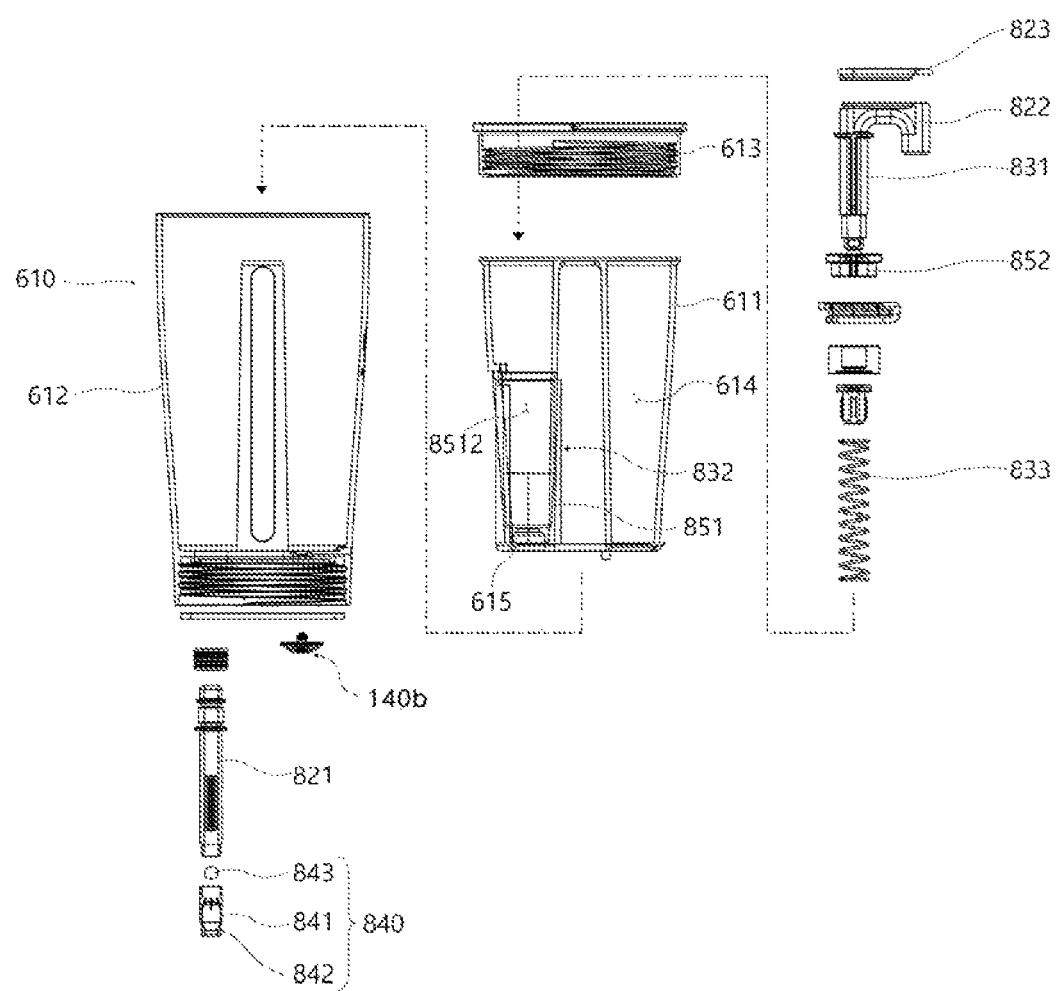
FIG. 18 is an exploded view illustrating a configuration of a lower tray in the beverage making tumbler illustrated in FIG. 15.

Referring to FIG. 18, the lower tray 610 may include a first body 611, a second body 612, and a coupling part 613.

The first body 611 has a cylindrical shape with a closed bottom and an open top and has a through-hole 615 through which the pumping unit 800 is installed.

The second body 612 is fixedly coupled to the inside of the first body 611 with a space provided therebetween to form the air layer. The second body 612 has the drinking water storage space 614 formed therein and is coupled with the pumping unit 800. In this case, the first body 611 and the second body 612 may be fixedly coupled through, e.g., fusion. However, various fixing methods may be applied according to the material of the first body 611 and the second body 612.

The piston housing 832 may be fixedly coupled to the inside of the second body 612 and, as shown, the second body 612 may be integrally formed with the piston housing 832 and simultaneously formed and manufactured.

The coupling part 613 is fitted to the first body 611 so that the lower end thereof comes in contact with the upper end of the second body 612 and is detachably coupled to the closure part 630.

The additive tray 700 is detachably coupled to the lower portion of the drinking water tray 600 via screwing. The additive tray 700 has an open top and closed bottom and is configured to include an additive storage space 701 for storing a liquid additive.

Figure 19:
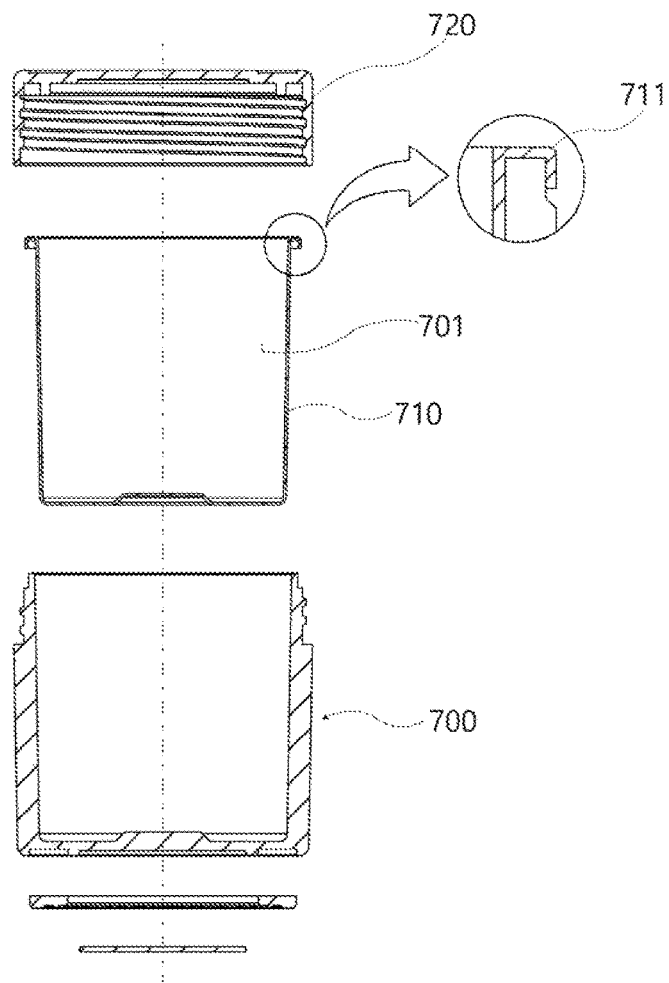
FIG. 19 is a front, cross-sectional view illustrating an additive tray and an additive capsule in the tumbler for beverage making illustrated in FIG. 15.

Referring to FIG. 19, the additive tray 700 may include an additive capsule 710 inserted into the additive storage space 701 and containing an additive.

The additive capsule 710 has an open top and closed bottom so as to correspond to the shape of the additive storage space 701 of the additive tray 700, so that the outer surface thereof comes in contact with the inner surface of the additive storage space 701.

The additive capsule 710 may have a seating part 711 bent so that the upper end thereof surrounds the side of the upper end of the additive tray 700.

The seating part 711 may lead to better assembly into the inside of the additive tray 700, effectively prevent the inflow of the additive into the inside of the additive tray 700, and prevent deformation of the upper end during assembly.

The pumping unit 800 is installed in each of the drinking water tray 600 and the additive tray 700 to pump the additive from the additive storage space 701 to the drinking water storage space 614.

The pumping unit 300 is configured to move each constant amount of the additive by the user's pumping, thereby adjusting the amount of additive to be added depending on the number of times of pumping.

The pumping unit 800 is installed along the longitudinal direction of the additive tray 700 and the drinking water tray 600 as shown and may be positioned adjacent to the inner surface of the additive tray 700 and the drinking water tray 600.

Specifically, the pumping unit 800 may include a pumping button part 810, a pumping part 820, and an airtight means 850.

The pumping button part 810 is installed to slidingly reciprocate on the upper tray 620 and is configured to move as pressurized by the user.

The pumping button part 810 may include a stem part 811 and a guide bushing 812.

The stem part 811 is installed in the insertion hole 633 (see FIG. 15) of the drinking water tray 600 so as to be slidably moved, and the upper portion of the stem part 811 is exposed to the outside from the upper portion of the drinking water tray 600 to be pressurized by the user, and the lower portion of the stem part 811 is configured to transfer external force to the pumping part 820.

The guide bushing 812 is configured in a tubular shape to allow the stem part 811 to be inserted therethrough and to guide the stem part 811 to reciprocate and is inserted in the upper inside of the airtight means 850. The guide bushing 812 may be configured such that the lower end side of the flange portion formed at the upper end comes in contact with the upper surface of the insertion hole 633 to be fixedly supported to the insertion hole 633.

The guide bushing 812 fixes the upper end of the airtight means 850 to the inner circumferential surface of the insertion hole 633 through the flange portion and reduces friction with the airtight means 850 when the stem part 811 moves up and down, preventing damage to the airtight means 850.

The pumping part 820 is located in the drinking water storage space of the lower tray 610 and is moved up and down by the reciprocating movement of the pumping button part 810, and is connected to communication with each of the drinking water storage space 614 and the additive storage space 701, thereby sucking up the additive and discharging the additive to the drinking water storage space 614 as the pumping part 820 moves up or down.

The pumping part 820 may include a suction tube 821, a piston part 830, a discharge tube 822, and an opening/closing valve 840.

The suction tube 821 is shaped as a hollow tube. One side of the suction tube 821 extends to the inside of the additive tray 700 to communicate with the additive storage space 701, and the other side thereof is disposed in the drinking water storage space 614 so that the additive in the additive storage space 701 is introduced by the piston part 830.

In this case, the suction tube 821 is disposed adjacent to the inner surface of the additive tray 700 and the drinking water tray 600, and the lower end thereof is positioned adjacent to the bottom of the additive tray 700, so that the additive in the additive storage space 701 may be easily introduced and the additive may be sucked without leaving a residue by tilting the additive tray 700.

Although not shown, a mesh may be installed at the suction end of the suction tube 821, preventing impurities from flowing into the pumping part 820 and thus functional deterioration of the pumping part 820.

The piston part 830 is located in the drinking water storage space 614 and is connected to communicate with the other end of the suction tube 821, sucking the additive from the suction tube 821 as the pumping button part 810 reciprocates and discharging the sucked additive to the discharge tube 822.

The piston part 830 may include a piston rod 831, a piston housing 832, and an elastic member 833.

The piston rod 831 is interlocked with the pumping button part 810 to move up and down by the reciprocating movement of the pumping button part 810, and is inserted into the internal space of the piston housing 832 and has a flow path formed thereinside to allow the additive in the piston housing 832 to be moved upon pumping.

In the piston housing 832, the piston rod 831 is installed to ascend or descend in the internal space, and the suction tube 821 and the discharge tube 822 are connected to communicate with each other. The additive is introduced from the additive storage space 701 to the internal space by a change in the internal pressure due to the ascent or descent of the piston rod 831.

As the additive is introduced into the piston housing 832, the piston housing 832 needs to be cleaned after use.

The piston housing 832 includes the piston body 851 and the piston cover 852 detachably coupled to each other. For cleaning, the piston cover 852 is removed to open the internal space and, in use, the piston cover 852 is coupled to shield the internal space.

Specifically, the piston body 851 has an open upper portion and a lower portion connected to communicate with the suction tube 821. The internal space is formed inside the piston body 851.

The piston body 851 may be fixed to the second body 612 to be described below and, as shown, the piston body 851 may be integrally formed with the second body 612 and may be manufactured simultaneously.

The piston cover 852 is coupled to the upper portion of the piston body 851, shields the upper portion of the piston body 851, and allows the discharge tube 822 to be inserted therethrough.

The piston cover 852 is supported upward by the elastic member 833 and tightly contacts the piston body 851.

A configuration for detachably coupling the piston body 851 with the piston cover 852 is described below.

Referring to FIG. 20, the piston body 851 may have one or more detachable grooves 8511 formed on the inner circumstantial surface of the upper end thereof.

Further, the piston cover 852 may have a detachable protrusion 8521 on the outer circumferential surface thereof, that is detachably fastened to the detachable groove 8511 according to rotation.

The detachable protrusion 8521 and the detachable groove 8511 are formed in shapes and sizes corresponding to each other and, when their positions are matched, the locking of the detachable protrusion 8521 is released and, when the positions are not matched, the detachable protrusion 8521 may be stuck and locked by their mutual interference.

For cleaning, the user presses the piston cover 852 to separate the piston cover 852 from the piston body 851 and then turn it to position the detachable protrusion 8521 in the detachable groove 8511, thereby unlocking the detachable protrusion 8521 from the detachable groove 8511 and removing the piston cover 852.

For assembly of the piston cover 852, the user performs the steps in the opposite order. For example, the user positions the detachable protrusion 8521 of the piston cover 852 in the detachable groove 8511 and then presses it to allow the detachable protrusion 8521 to be stuck to the upper end of the piston body 851.

The positions in which the detachable protrusion 8521 and the detachable groove 8511 are formed may be limited by the coupling position of the pump unit to the lower tray 610. This is why, as the discharge tube 822 extends horizontally, the rotation of the rotary closing part 640 may be restricted by the interference of the discharge tube 822 with the lower tray 610. Accordingly, it is preferable to set the positions of the detachable protrusion 8521 and the detachable groove 8511 considering the above-described rotatable range of the discharge tube 822.

The elastic member 833 is located inside the piston housing 832 and is coupled with the piston rod 831 and provides a restoring force so that the piston rod 831 is pressed and moved downward and then moved upward.

The discharge tube 822, shaped as a hollow tube, extends from an end of the piston part 830 and is installed inside the drinking water storage space 614 and discharges the pumped additive to the drinking water storage space 614.

The discharge tube 822 has one side connected to communicate with the upper portion of the piston rod 831 and the other side to communicate with the drinking water storage space 614 to supply the additive to the drinking water storage space 614. The discharge tube 822 may be configured so that the other end thereof is bent downward, as shown, allowing the additive to fall to the drinking water storage space 614.

The discharge tube 822 may have a sliding opening/closing part 823 formed on the outer circumstantial side thereof so that the user may easily clean the moving passage of the additive.

The sliding opening/closing part 823 is provided on the upper surface of the discharge tube 822, and when slid in the horizontal direction by the user, the internal space where the additive moves is open.

The opening/closing valve 840 is installed below the piston housing 832 to which the suction tube 821 is connected, and serves to selectively open and close the suction tube 821 as the piston rod ascends or descends.

The opening/closing valve 840 may include a spherical ball valve 843 that is installed on a valve flowpath 842 communicating with the suction tube 821 and the internal space of the housing, and moves according to the elevation of the piston rod 831 to open and close the valve flowpath 842. Reference numeral 841 denotes a valve body.

The ball valve 843 is moved upward when a suction force is generated in the piston housing 832 to open the valve flowpath 842, and when a compressive force is generated in the piston housing 832, the ball valve 843 is moved downward to shield the valve flowpath 842.

The ball valve 843 may be formed of a spherical, hard ball of metal, ceramic, or synthetic resin.

The airtight means 850 is coupled to the pumping button part 810 to divide the pumping button part 810 and the pumping part 820 and maintains the airtightness between the pumping button part 810 and the pumping part 820.

The airtight means 850 is formed in a cylindrical tube shape with an open upper portion and a closed lower portion. The pumping button part 810 is inserted through an inner surface of the airtight means 850 so that the lower surface of the pumping button part 810 contacts the bottom surface, and the lower end surface contacts the pumping part 820.

The airtight means 850 may be configured of a bellows which has multiple pleats along the outer circumferential surface to be extended or contracted in the upper and lower directions.

Since the detailed configuration of the airtight means 850 is substantially the same as the configuration of FIG. 6, no detailed description thereof is presented.

The tumbler for beverage making may include an air introduction means 140b (see FIGS. 15 and 18) installed on an air introduction passage in which the outside and the additive storage space 701 communicate with each other and automatically opens and closes the air introduction passage to allow air to flow into the additive storage space 701.

The air introduction means 140b is formed of a pressure-responsive elastic button and is configured to automatically open and close the air introduction passage formed on the bottom of the lower tray 610 to allow the outside to communicate with the additive storage space 701, according to the difference in atmospheric pressure between inside and outside of the additive tray, moving the air outside the additive tray to the inside of the additive tray. Here, since the air introduction means 140b is substantially similar in configuration and operation to the air introduction means 140a described above in connection with FIG. 8, no detailed description thereof is given.

Meanwhile, although an example has been described above in which the air introduction means 140b is a pressure-responsive elastic button, this is merely an embodiment, and the air introduction means 140b may adopt the pressurizing type illustrated in FIG. 7. Meanwhile, reference numerals 6513 and 720 denote a fixing cap and an additive tray cover, respectively.

Described below with reference to FIGS. 21 to 24 are the rotational operation of the rotary closing part 640 in connection with the storage mode, drinking mode, and pumping mode and the elevation of the shielding module 650.

First, as described above, the upper tray 620 may be configured to have a storage mode, a drinking mode, and a pumping mode according to the rotation of the rotary closing part 640.

In this case, the elevating movement of the shielding module 650 may be performed by pitch movement by screwing between the elastic member 663, the rotation shaft part 6512, and the rotation shaft 651 or, although not shown, may be alternatively performed by the inclination of the cam screw without the elastic member 663 as described above.

Described below is an embodiment in which the ascent and descent of the shielding module 650 is performed by screwing between the elastic member 663, the rotation shaft part 6512, and the rotation shaft 651.

FIG. 21 illustrates the position of the rotary closing part 640 and the operation of the shielding module 650 in the pumping mode.

Referring to the drawing, in the pumping mode, the rotary closing part 640 allows the user to press the pumping button part 810 as the opening 641 is located on the left side where the pumping button part 810 is positioned.

In the shielding module 650, the packings 6621, 6641, and 6651 come in tight contact with the mouthpiece 632 to prevent the beverage from leaking out through the mouthpiece 632 upon pumping, thereby shielding the mouthpiece 632 and the air hole 634 so that the drinking water storage space 614 is completely sealed.

In this case, an inclined surface may be formed for the surface where the guide groove 642 and the stopper protrusion 635 contact each other, as described above.

FIG. 22 illustrates the position of the rotary closing part 640 and the operation of the shielding module 650 in the storage mode.

Referring to the drawing, in the storage mode, the rotary closing part 640 rotates −90 degrees counterclockwise (the counterclockwise rotation is referred to as a negative direction) from the pumping mode, allowing only the top surface of the closure part 630 to be exposed and hence preventing unintentional pumping or exposure of the mouthpiece 632.

In this case, in the storage mode, the shielding module 650 is configured so that although the rotary closing part 640 rotates from the pumping mode, the packings 6621, 6641, and 6651 of the shielding part 662 tightly contact the mouthpiece 632 and, from the pumping mode to the storage mode, the shielding part 662 shields the mouthpiece 632.

As described above, even in the storage mode, the shielding module 650 is configured such that the packings 6621, 6641, and 6651 of the shielding part 662 shield the mouthpiece 632 to prevent leakage of the beverage when stored. Further, the air hole 634 is also shielded so that the drinking water storage space 614 is completely sealed.

FIG. 23 illustrates the position of the rotary closing part 640 and the operation of the shielding module 650 in the thinking mode.

Referring to the drawing, in the drinking mode, the rotary closing part 640 rotates −180 degrees counterclockwise from the pumping mode, so that the opening 641 is located on the right side where the mouthpiece 632 is positioned, allowing the user to drink the beverage through the mouthpiece 632.

In this case, in the shielding module 650, the shielding part 662 descends to open the mouthpiece 632 so that the beverage in the drinking water storage space 614 may be discharged through the mouthpiece 632.

In this case, the air hole 634 is open so that when the user consumes the beverage through the mouthpiece 632, external air flows into the drinking water storage space 614, aiding the user in easily drinking the beverage.

The guide groove 642 and the stopper protrusion 635 may be formed as a rectangular groove and protrusion with a high inclination for the surface where they face each other as described above.

Although described above is an embodiment of the present invention, in which the storage mode, drinking mode, and pumping mode are switched at a rotation angle of 90 degrees, this is merely an embodiment, and such mode switching may occur at other various rotation angles.

As described above, the detailed movement position of the shielding module 650 is configured to maintain the elevated state of the shielding part 662 in the pumping mode and the storage mode to shield the mouthpiece 632 while moving down the shielding part 662 to open the mouthpiece in the thinking mode.

Described below is an embodiment in which the ascent and descent of the shielding module 650 is controlled by the elastic member 663.

First, as the upper end of the elastic member 663 is supported on the lower portion of the support body 661, and the lower end thereof is supported on the lower end of the rotation shaft part 6512 as shown, an upward elastic supporting force is added to the support body 661.

Accordingly, while the rotation shaft part 6512 moves downward from the upper end position by the rotation of the rotation shaft 651, the flan portion 6512a contacts the support body 661 in a preset position, and thereafter, moves down together with the support body 661 while restricting the support body 661.

In this case, the contact position may be set as the storage mode position (point b), but the contact position may be set as a position (point b') between the storage mode and the drinking mode.

In the above-described embodiment, the ascent and descent of the shielding module 650 is controlled by the pitch movement through screwing between the elastic member 663, the rotation shaft part 6512, and the rotation shaft 651. Unlike in the above-described embodiment, described below is the operation of the shielding module 650 for each mode when a switch to the pumping mode, storage mode, or drinking mode is performed by a cam screw configured as an inclined cam.

Figure 24:
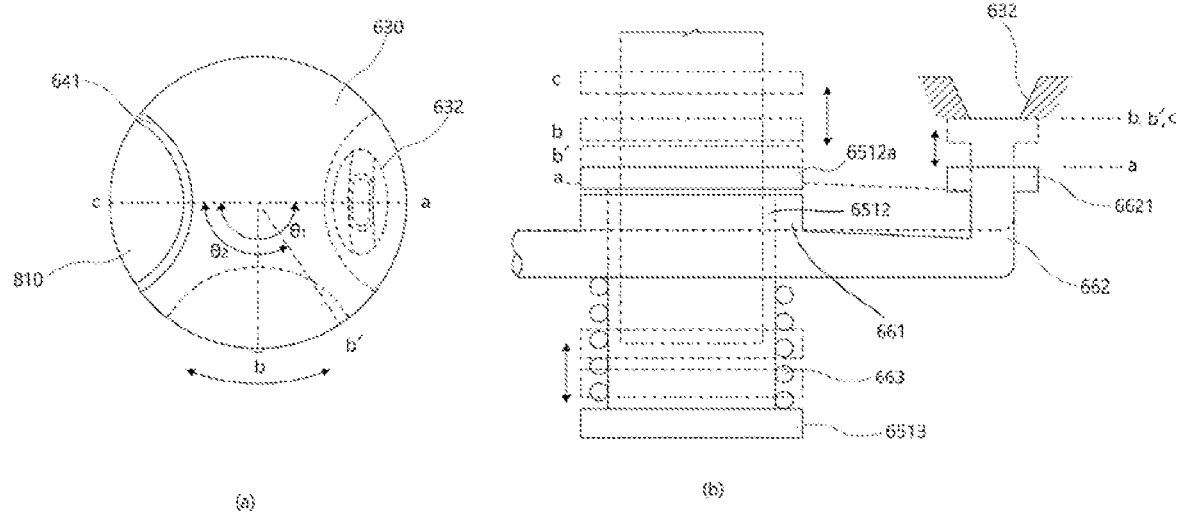
FIG. 24 is a view illustrating the position of a rotary closing part and the operation of a shielding support part in each mode in the beverage making tumbler of FIG. 21.
Figure 25:
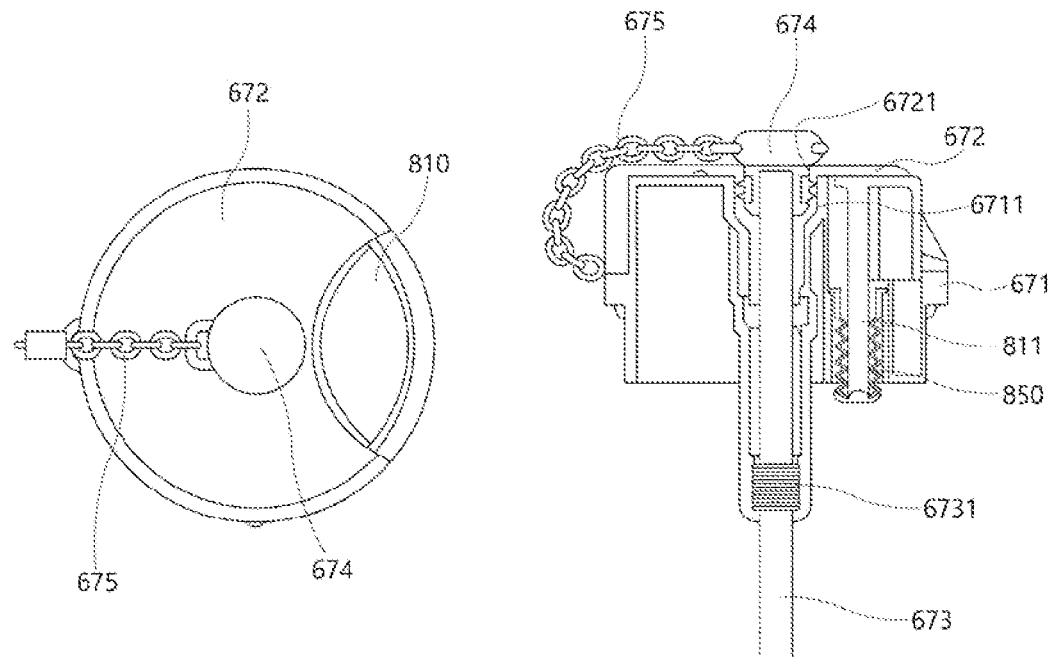
FIG. 25 illustrates a plan view and a front cross-sectional view of another embodiment of an upper tray having a straw part in the tumbler for beverage making of FIG. 13.
Figure 26:
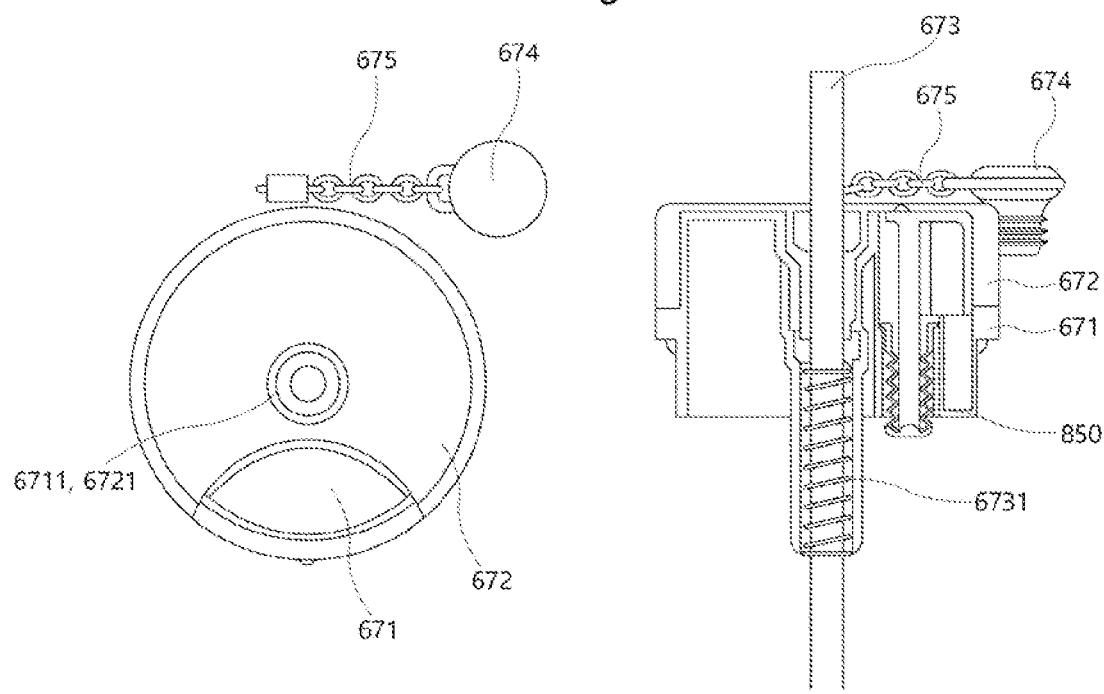
FIG. 26 illustrates a plan view and a front cross-sectional view illustrating an example in which an opening/closing cap is open in the tumbler for beverage making of FIG. 25.

(a) of FIG. 24 is a view illustrating each mode according to the rotation of the rotary closing part 640, wherein a is the drinking mode, b is the storage mode, and c is the pumping mode, and (b) of FIG. 24 illustrates the opening and closing operation of the mouthpiece 632 by the shielding part 662 in each mode.

Here, the rotation shaft part 6512 is inserted into the insertion hole of the support body 661 to be slidably moved, and has a flange portion 6512a formed at the upper end thereof to constrain the upper movement of the support body 661.

First, when the position of the opening 641 of the rotary closing part 630 in the drinking mode is located on the right side (point a in (a)), the shielding part 662 is in a lowered state and the mouthpiece 632 is opened (point a in (b)).

Thereafter, when the opening 641 of the rotating part 630 is positioned at a middle lower side (point b of (a)) to become the storage mode, the shielding part 662 moves up or down to shield the mouthpiece 632 (point b of (b)).

In the pumping mode, the opening 641 of the rotary closing part 630 is located on the left (point c in (a)) to maintain the shielded state of the mouthpiece 632 (point c in (b)).

In the above-described configuration, the opening of the mouthpiece 632 is performed as the rotary closing part 640 gradually descends starting from the point at which the rotary closing part 630 is rotated from the storage mode to the drinking mode.

That is, it may be said that the mouthpiece 632 is opened from point b, which is the storage mode, and accordingly, the section in which the mouthpiece 632 is shielded is from the pumping mode c to the storage mode b.

Accordingly, the present invention moves the time when the mouthpiece 632 is opened from the point b to the point b', thereby increasing the section in which the mouthpiece 632 is shielded, so that the mouthpiece 632 is stopped from opening even when the rotary closing part 640 rotates, further enhancing airtightness. That is, even when the rotary closing part 630 rotates slightly toward the drinking mode from the central point which is the storage mode, the airtightness of the tumbler may be maintained.

Meanwhile, the present invention may adjust the opening timing of the mouthpiece 632 through the cam inclination angle of the above-described cam screw.

In the drawings, when adjusting the opening timing of the mouthpiece 632 as described above, $\theta 1$ denotes the rotation angle of the closing part 640 from the pumping mode to the drinking mode, and $\theta 2$ denotes the rotation angle of the rotary closing part 640 at which the mouthpiece 632 is shielded.

Hereinafter, the operation of the tumbler for beverage making, including sucking and discharging the additive, is described.

First, with drinking water and a liquid additive filling the drinking water tray 600 and additive tray 700, and the additive filling the piston housing 832, the pumping unit 800 is operated to mix the liquid additive with the drinking water.

To this end, the user rotates the rotary closing part 640 to become the pumping mode so that the pumping button part 810 is exposed to the opening 641, and when the user presses the pumping button part 810 downward, the piston part 830 is also moved down accordingly.

Then, the piston rod 831 in the piston housing 832 moves downward and the pressure inside the piston housing 832 increases. Accordingly, the ball valve 843 moves downward, shielding the valve flowpath 842, while the additive in the piston housing 832 is simultaneously introduced into the drinking water storage space 614 through the flow path of the piston rod 831 and the discharge tube 822.

When the user releases the pressure applied to the pumping button part 810 in the state, the piston rod 831 is restored and moved upward by the elastic member 663, and the pressure in the piston housing 832 is changed to a low pressure. Accordingly, the ball valve 843 moves upward, opening the valve flowpath 842.

When the valve flowpath 842 is open in such a way, the additive in the additive storage space 701 is moved through the suction tube 821 to the piston housing 832, filling the piston housing 832.

The user may inject each constant amount of additive from the additive tray 700 to the drinking water tray 600 by repeatedly pressing the pumping button part 810.

When the additive is added to the drinking water as described above, the user who desires to drink the mixture rotates the rotary closing part 640 to the drinking mode to open the mouthpiece 632 and may drink the beverage which is mixed with the additive through the mouthpiece 632.

Meanwhile, in order to store the tumbler for beverage making, the rotary closing part 640 is rotated so that the opening 641 is shielded by the closure part 630.

Other embodiments of the upper tray 620 are described below.

Referring to FIGS. and 26, the upper tray 620 is provided with a straw part 673, so that the user may drink drinking water or a beverage through the straw part 673 instead of the mouthpiece 632.

Specifically, the upper tray 620 may include a closure part 671, a rotary closing part 640, a screw part 673, and an opening/closing cap 674.

The closure part 671 is detachably coupled to the lower tray 610 and has a first through-hole 6711 formed in the center of the upper surface thereof. The pumping unit 800 spaced apart from the first through-hole 6711 is inserted through the upper surface.

The rotary closing part 672 has a second through-hole 6721 formed in the center of the upper surface thereof, corresponding to the first through-hole 6711, and the rotary closing part 672 is coupled to the upper portion of the closure part 671 to be rotated along the circumferential direction by external force.

The rotary closing part 672 has an opening 641 formed to expose the closure part 671, so that the upper portion of the pumping unit 800 is selectively exposed by rotation.

The straw part 673 which has a tubular shape is configured to allow the user to drink the drinking water or beverage in the drinking water storage space 614, and is simultaneously inserted through the first through-hole 6711 and the second through-hole 6721, and the inserted end is located in the drinking water storage space 614 to allow the drinking water to be introduced.

The straw part 673 is formed with a corrugated portion 6731 to be elastically extended and contracted in the upper and lower directions, so that the straw part 673 is shrunk to shield the opening/closing cap 674 for storage and, for drinking, the opening/closing cap 674 is opened and the straw part 673 is stretched, allowing the user easier use.

The opening/closing cap 674 is detachably fitted to the second through-hole 6721 to shield the second through-hole 6721 with the straw part 673 shrunken, and is connected with the rotary closing part 672 through a connecting member 675, preventing loss.

Figure 27:
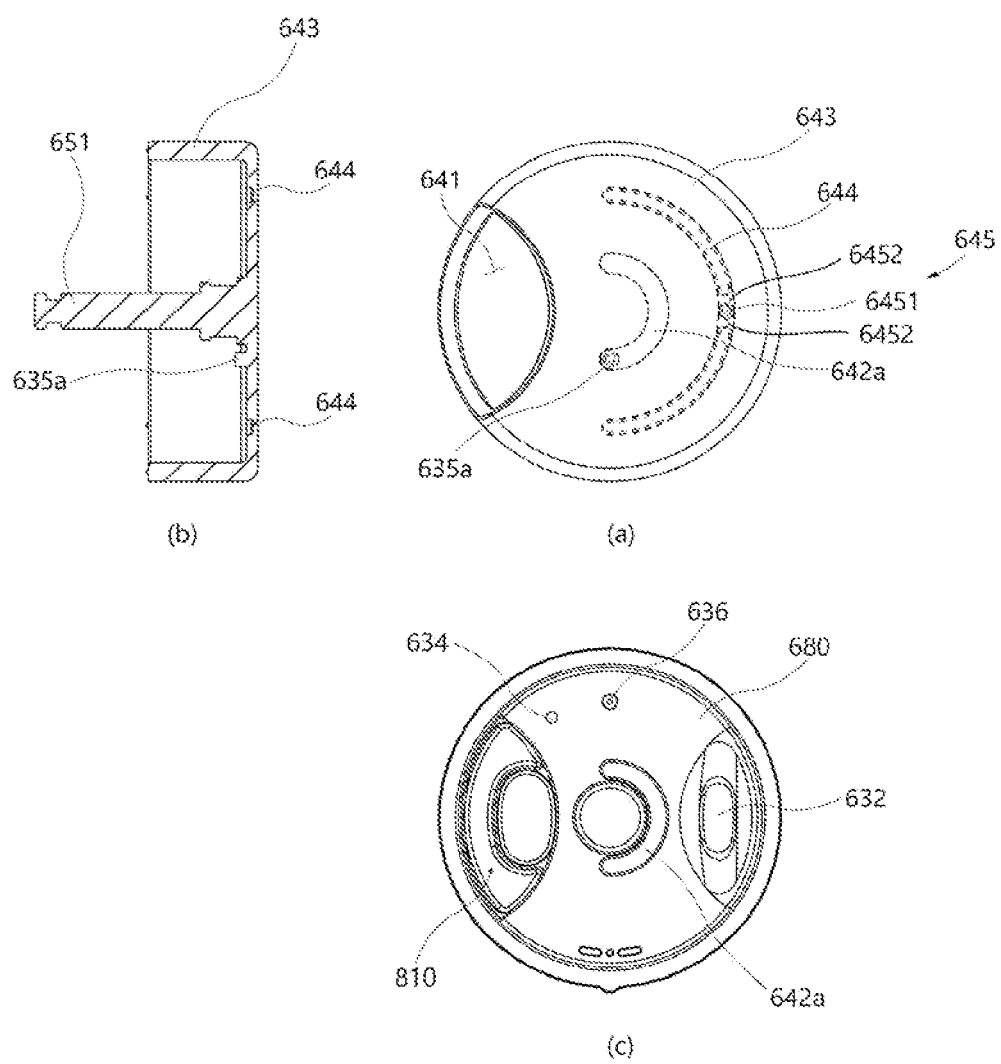
FIG. 27 illustrates a plan view and a front cross-sectional view illustrating another embodiment of a rotary closing part and closure part in the tumbler for beverage making of FIG. 13.

FIG. 27 illustrates another embodiment of the rotary closing part and closure part in the tumbler for beverage making. In FIG. 27, (a) shows a plan view of the rotary closing part, (b) shows a side cross-sectional view of the rotary closing part, and (c) shows a plan view of the closure part to which the pumping unit is coupled. The following description focuses primarily on components different from those of the above-described rotary closing part and closure part, wherein the same reference denotations refer to the same components.

First, referring to (a) and (b) of FIG. 27, the rotary closing part 643 has a stopper protrusion 635a and an anti-leak groove 644 formed on a lower surface thereof.

The stopper protrusion 635a protrudes from the lower end side of the rotary closing part 643 and is fitted into the guide groove 642a of the closure part 680 described below.

The stopper protrusion 635a is formed to be stuck to the inner surface of the guide groove 642a when the rotary closing part 643 rotates to thereby limit the rotation angle of the rotary closing part 643, thereby preventing excessive rotation of the rotary closing part 643. This is similar in configuration and objective to the above-described stopper protrusion 635, and no detailed description thereof is given.

In the drawing, the stopper protrusion 635a is located inside the anti-leak groove 644 with respect to the center of the rotary closing part 643, but this is merely an embodiment, and other various positions may be chosen.

At least one of a side surface of the stopper protrusion 635a and an inner surface of the guide groove 642a, which face each other, may have an inclined surface to reduce an external force by which the stopper protrusion 635a escapes off the guide groove 642a.

The inclined surface allows the stopper protrusion 635a to move beyond the guide groove 642a when a certain external force is applied, as described above, so that the rotary closing part 643 may be easily separated from the closure part 680. In this case, the inclined surface should not be formed in a direction in which excessive rotation of the rotary closing part 643 should be prevented, but should be formed in the opposite direction to facilitate disassembly, which is skipped from a detailed description since it is substantially the same as that for the configuration of the stopper protrusion 635 and the guide groove 642 described above in connection with FIG. 17.

The anti-leak groove 644 is formed on the lower surface of the rotary closing part 643, and is configured such that the air hole 634 is located inside the groove in the drinking mode. Thus, the anti-leak groove 644 prevents the drinking water flowing back into the air hole 634 according to the internal pressure when the air shielding part 664 escapes off the air hole 634 from leaking out the tumbler for beverage making.

Specifically, the anti-leak groove 644 may prevent the drinking water from spreading and leaking out along a tiny gap between the rotary closing part 643 and the closure part 680 when the drinking water attached to the air hole 634 by the surface tension of the air hole 634 is rendered to leak out of the air hole 634 by the pumping pressure.

That is, the anti-leak groove 644 prevents the drinking water flowing back through the air hole 634 from contacting the joint end between the rotary closing part 643 and the closure part 680, thus preventing the drinking water from spreading and leaking out along the tiny gap from the joint end.

Here, the anti-leak groove 644 may be configured to be located on the same circumference as the air hole 634 so as to coincide with the movement path of the air hole 634 when the rotary closing part 643 rotates.

Further, the anti-leak groove 644 is formed to have a width greater than the diameter of the air hole 634 to have the air hole 634 positioned thereinside. Preferably, the anti-leak groove 644 is formed with a width large enough to be able to include the spreading range of the flowing-back drinking water. That is, the size and position of the air hole 634 may be set to be located and received within the width of the anti-leak groove 644.

The seating protrusion 636 may be fitted into the anti-leak groove 644. The seating protrusion 636 is fitted into the anti-leak groove 644 and moves along the anti-leak groove 644 when the rotary closing part 643 rotates and may form an anti-escape part 645 to prevent the seating protrusion 636 seated in the corresponding position in the storage mode from escaping off.

The anti-escape part 645 is configured to prevent the seating protrusion 636 from escaping off when the seating protrusion 636 is seated and to allow the seating protrusion 636 to escape off only by external force generated by the user for switching the mode.

Therefore, since the seating protrusion 636 is located in the corresponding position by the anti-escape part 645 even when a small external force occurs in the storage mode, it is possible to prevent the opening of the mouthpiece due to rotation of the rotary closing part 643 in the storage state.

The anti-escape part 645 is formed on the bottom surface of the anti-leak groove 644 as shown and may include an anti-escape groove 6451 in which the seating protrusion 636 is seated and a stepped portion 6452 formed at each of the front and rear ends of the anti-escape groove 6451. In this case, the seating protrusion 636 moves along the anti-leak groove 644 when the mode is changed and, in a specific mode, e.g., the storage mode, the seating protrusion 636 is seated in the anti-escape groove 6451 and is prevented from escaping off.

The anti-escape groove 6451 is formed to have the same depth as the anti-leak groove 644, and the stepped portion 6452 restricts forward and backward movement of the seating protrusion 636 seated in the anti-escape groove 6451, constraining the seating protrusion 636 to the anti-escape groove 6451.

Other various embodiments than those of the anti-escape groove 6451 and the stepped portion 6452 may apply to the anti-escape part 645. For example, as described above, the anti-escape part 645 may be configured to prevent the seating protrusion 636 from escaping off by forming a different depth and width for the anti-escape groove 644.

Referring to (c) of FIG. 27, the closure part 680 includes a seating protrusion 636 and a guide groove 642a. The seating protrusion 636 protrudes from the upper surface of the closure part 680 and is fitted into the anti-escape groove 6451.

The guide groove 642a is formed on the upper surface of the closure part 680, and the stopper protrusion 635a is fitted into the guide groove 642a. The guide groove 642a is formed in an arc shape to correspond to the radius of rotation of the rotary closing part 643 in the pumping mode or drinking mode.

A preferred embodiment of an additive storage capsule according to the present invention is described below in detail with reference to the accompanying drawings.

Figure 28:
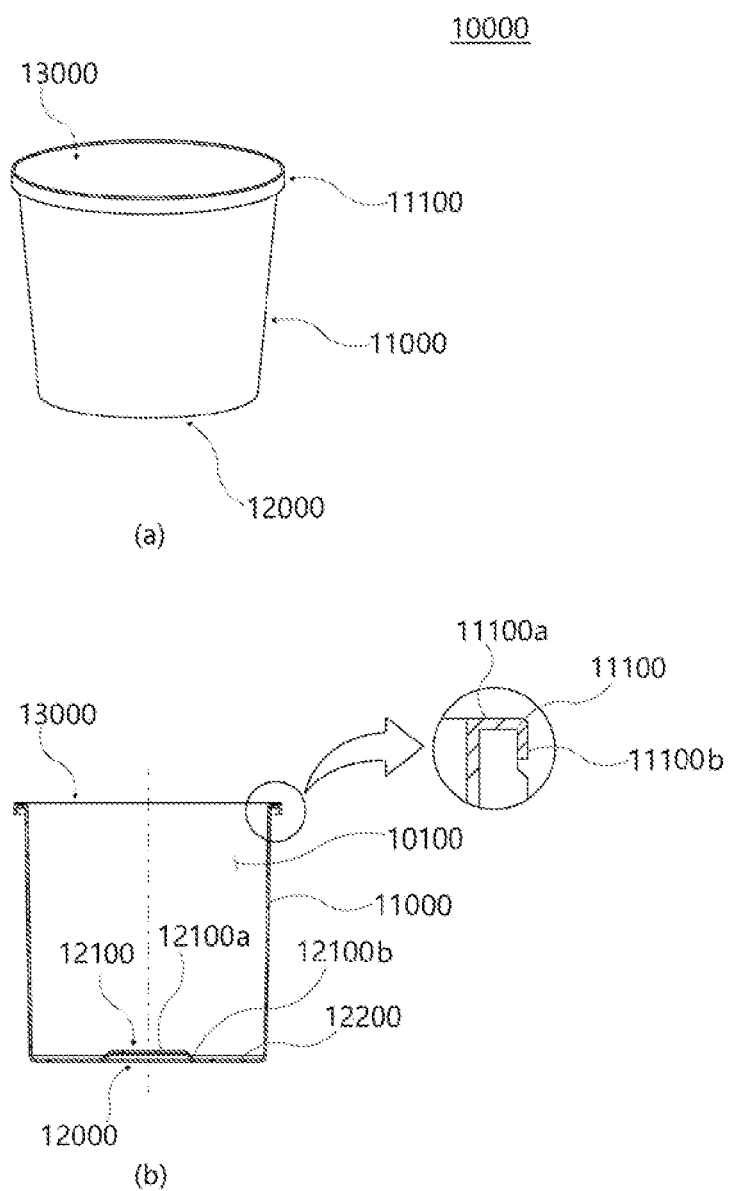
FIG. 28A is a perspective view illustrating an additive storage capsule according to an embodiment of the present invention and FIG. 28B is a side view thereof.

The additive storage capsule of the present invention separately stores an additive for beverage making and, when necessary, is received in the tumbler for use. to be used by storing the additive for beverage preparation separately and then storing it in a tumbler when filling. FIG. 28 is a perspective view of an additive storage capsule according to an embodiment of the present invention, and (b) is a side view thereof.

Referring to FIG. 28, the additive storage capsule 10000 of the present invention may largely include a side wall part 11000, a bottom part 12000, and a sealing film 13000. This will be described below in more detail. A tumbler 20000 for beverage making in which the additive storage capsule 10000 of the present invention is used is first described to aid an understanding of the present invention.

Figure 29:
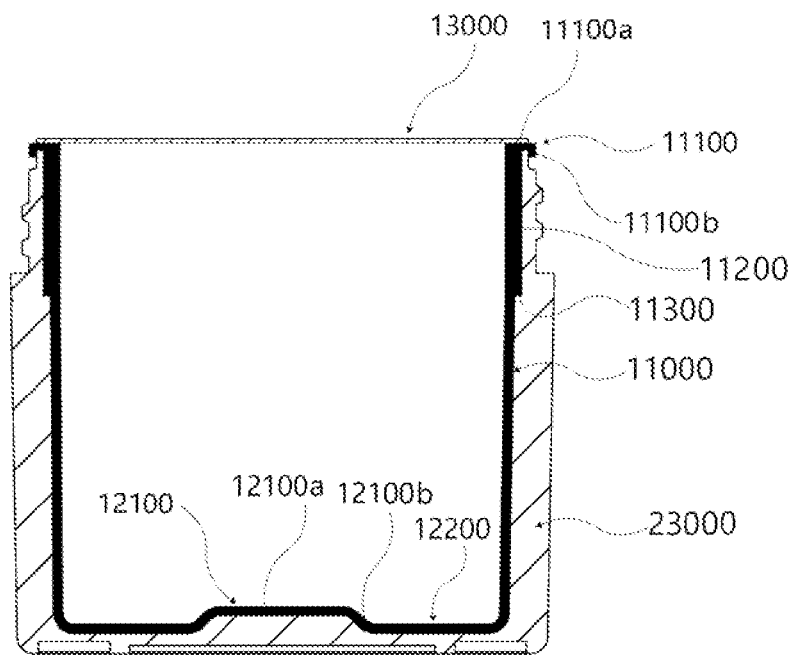
FIG. 29 is a cross-sectional view illustrating a state in which an additive storage capsule of the present invention is received in an additive tray of a tumbler.

FIG. 29 is a cross-sectional view illustrating a state in which the additive storage capsule 10000 is received in the additive tray 23000.

As illustrated in FIG. 29, the additive storage capsule 10000 according to the present invention is configured to be received and used in an additive tray 23000 of the tumbler 20000 for producing beverages. In this case, when the additive storage capsule 10000 is inserted into the additive tray, the side wall part 11000 is located in contact with the inner surface 23200 of the additive tray 23000, and the bottom portion 12000 is located in contact with the bottom surface 23300 of the additive tray 23000.

Thus, according to the present invention, rather than directly putting the additive into the tumbler 20000 for beverage making, the additive storage capsule 10000 storing the additive is received and used. Thus, it may be possible to address additive loss or sanitary issues due to leakage of the additive which may arise when a liquid additive is injected to the tumbler and to easily inject the additive to the tumbler.

Further, as in the prior art, when a liquid additive is directly put into the additive storage space 23000 of the tumbler 20000, there is a cumbersome problem in that the additive storage space 23000 need be cleaned after use. In particular, sticky additives such as honey or red ginseng liquid may be hard to remove if sticking to the edge of the bottom of the receiving space.

However, according to the present invention, the foregoing issues may be solved by directly inserting the additive-containing capsule 10000 into the additive tray 23000.

Referring back to FIG. 29, in the additive storage capsule 10000 according to the present invention, the bottom portion 12000 may include a bottom protrusion 12100 formed to protrude inwardly and upward in a central portion thereof and a bottom surface portion 12200 formed between the side wall part 11000 and the bottom protrusion 12100.

Here, a lower surface end of the suction tube 24300 of the pumping unit 24000 may be positioned on the top of the bottom surface portion 12200 to extract the additive. In this case, an end of the suction tube 24300 may be located between the bottom surface portion 12200 and the top surface of the bottom protrusion 12100.

Accordingly, according to the present invention, the additive stored in the capsule 10000 is collected in the bottom surface portion 12200 without leaving a residue.

In this case, the bottom protrusion 12100 may include an inclined surface extending inward and upward of the bottom surface 12000 at a predetermined angle inward with respect to the vertical direction of the bottom surface 12000 and an upper surface 12100a horizontally extending inwardly from the inclined surface 12100b.

Accordingly, according to the present invention, even in the case of a highly viscous additive such as honey or red ginseng juice, the additive may be collected along the inclined surface 12100b of the bottom protrusion 12100 to the bottom surface portion 12200, preventing waste of the additive.

In the additive storage capsule 10000 according to the present invention, a seating part 11100, to be seated on the upper edge of the additive tray 23000, may be formed on the upper edge of the side wall part 11000.

In this case, the seating part 11100 may include a horizontal plate 11100a extending outwardly and in parallel by a distance corresponding to the thickness of the upper edge of the additive tray 23000 from the upper end of the side wall part 11000 and a vertical plate 11100b extending a predetermined distance downward from the end of the horizontal plate 11100a.

The seating part 11100 may lead to better assembly into inside of the additive tray 23000, effectively prevent the inflow of the additive into the inside of the additive tray 23000, and prevent deformation of the upper end during assembly. Further, the vertical plate 11100b of the seating part 11100 may provide an uncontaminated gripping area to thereby facilitate withdrawal of the capsule 10000 as described below.

According to the present invention, the sealing film 13000 performs a function of sealing the additive stored in the capsule 10000. Accordingly, after filling the capsule 10000 with an additive, it may be adhered to the upper edge of the side wall part 11000. In this case, the sealing film 13000 may be formed of a synthetic resin, such as vinyl. After inserting the additive storage capsule 10000 into the additive tray 23000, the sealing film 13000 may be detached from the upper edge of the side wall part 11000, for use.

According to the present invention, the side wall part 11000 may include a protrusion 11200 which results as the upper portion of its outer circumferential surface protrudes. In this case, at the boundary of the protrusion 12200, a step part 11300 that is seated on the inner surface 23200 of the additive tray 23000 is formed.

The additive storage capsule 10000 according to the present invention may be stably supported in the correct position of the additive tray 23000 by the step part 11300.

FIGS. 6(a) to 6(d) are side views illustrating embodiments of step parts formed on an outer circumferential surface of an additive storage capsule according to the present invention.

Figure 30:
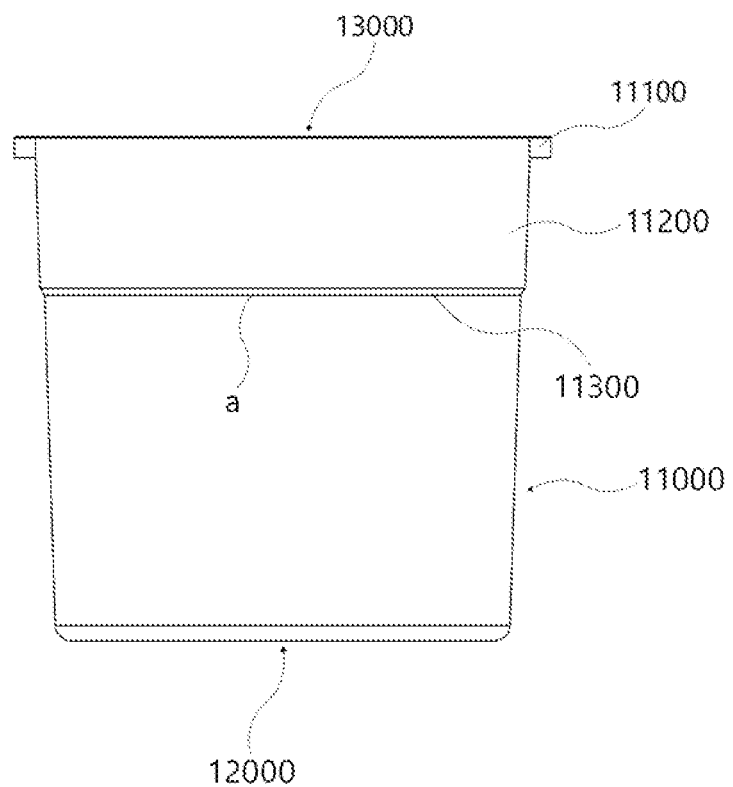
FIGS. 30, 31, 32, and 33 are side views illustrating embodiments of step parts formed on an outer circumferential surface of an additive storage capsule according to the present invention.

First, referring to FIG. 30, the step part 11300 may be formed in a horizontal direction (a) along the outer circumferential surface of the side wall part 11000.

Figure 31:
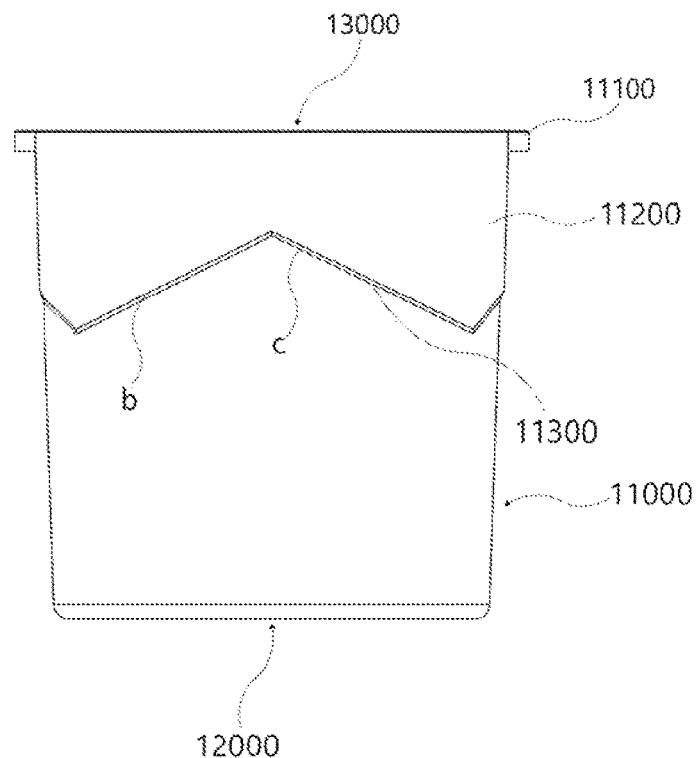

Further, referring to FIG. 31, the step part 11300 may include a line segment (b) having a positive inclination angle with respect to the horizontal direction and a line segment (c) having a negative inclination angle along the outer circumferential surface of the side wall part 11000, which are connected continuously together while crossing each other. That is, the step part 13300 may be formed as a zigzagged line as shown.

Therefore, the additive storage capsule 10000 may be accurately disposed in the matching position of the inner surface 23200 of the additive tray 23000. Further, it is possible to prevent the capsule 10000 from rotating in the additive tray 23000 when in use.

Figure 32:
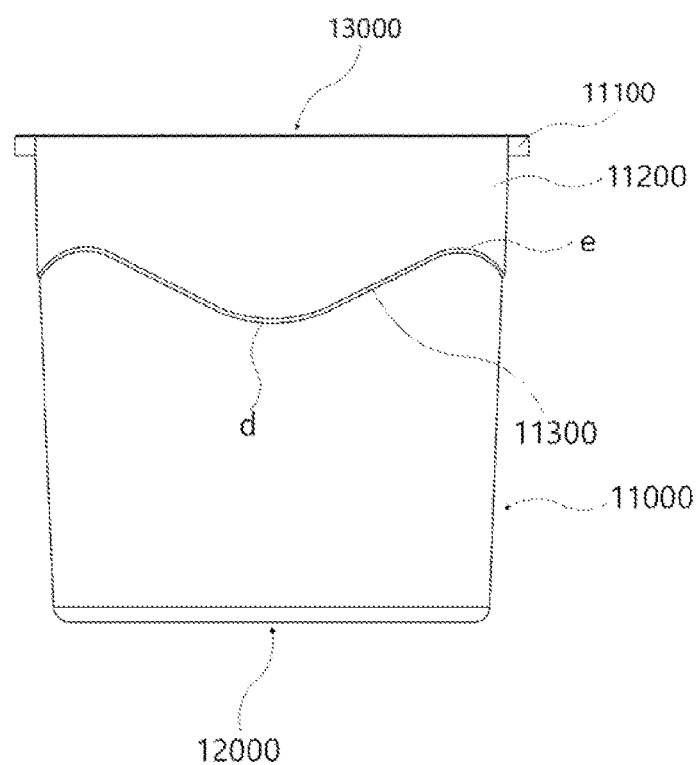

Referring to FIG. 32, the step part 11300 may include an arc (d) having a positive curvature with respect to the horizontal direction along the outer circumferential surface of the side wall part 11000 and an arc (e) having a negative curvature, which are connected continuously together while crossing each other. That is, the step part 11300 may be formed as a continuous wavy line as shown. Here, the arc (d) having a positive curvature means an arc that is convex upward, and the arc (e) having a negative curvature means an arc that is convex downward.

Therefore, the additive storage capsule 10000 may be accurately disposed in the matching position of the inner surface 23200 of the additive tray 23000, In particular, according to the present embodiment, upon withdrawing the additive storage capsule 10000 from the additive tray 23000, the user may rotate and withdraw the additive storage capsule 10000 easily by the rotational force of the wavy inclination, which is generated when the user grips and rotates the vertical plate 11100b of the seating part 11100.

Figure 33:
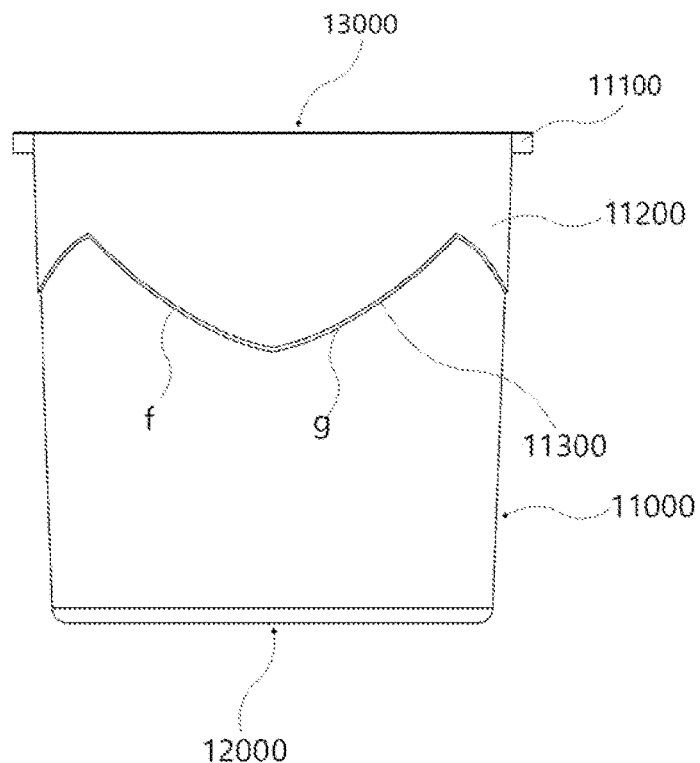

Referring to FIG. 33, an arc having a positive curvature and an arc having a negative curvature each may be formed of a combination of two arcs f and g having different center points. That is, the step part 11300 may be formed as a continuous wavy line with sharp ridges and a sharp valley as shown.

This embodiment corresponds to an embodiment which takes all the advantages of the embodiment of FIG. 31 and the embodiment of FIG. 32. Thereby, the additive storage capsule 10000 may be disposed in the correct matching position of the inner surface 23200 of the additive tray 23000 and may be easily withdrawn by the rotational force of the step part 11300 when the additive storage capsule 10000 is withdrawn.

The tumbler 10000 for beverage making according to the present invention may be formed of a variety of materials such as polypropylene (PP), Tritan, silicone, polyethylene, PET, etc., is easy to manufacture and resistant to heat.

Meanwhile, the additive storage capsule 10000 may additionally include a QR code to provide various information to the user.

Figure 34:
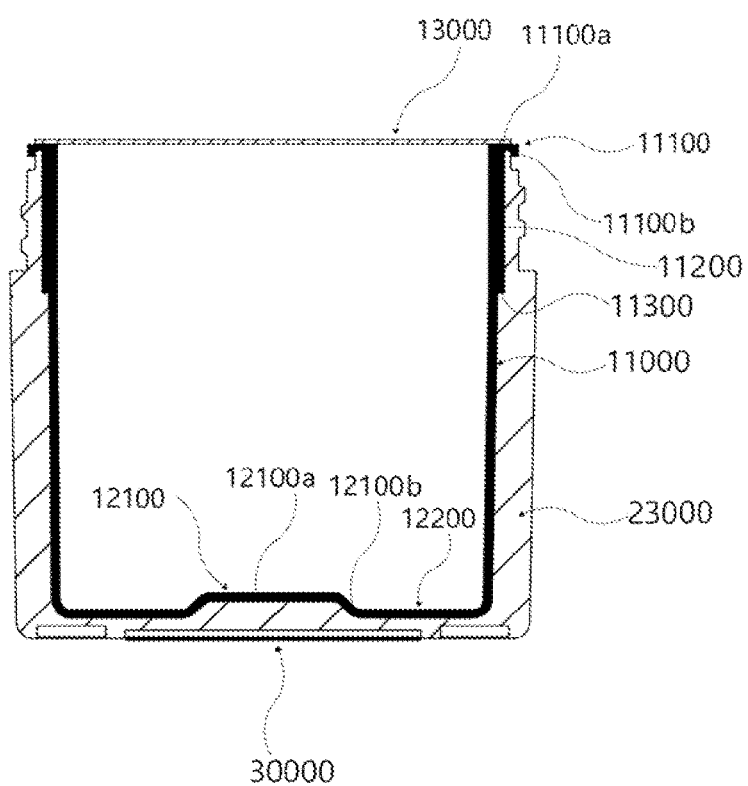
FIGS. 34 and 35 are cross-sectional views illustrating another embodiment of an additive storage capsule according to the present invention.

That is, as illustrated in FIG. 34, a QR code sticker 30000 may be attached to the lower portion of the additive tray 3000 to, when scanned, provide various information according to the use of the beverage manufacturing tumbler to the user's portable terminal.

Figure 35:
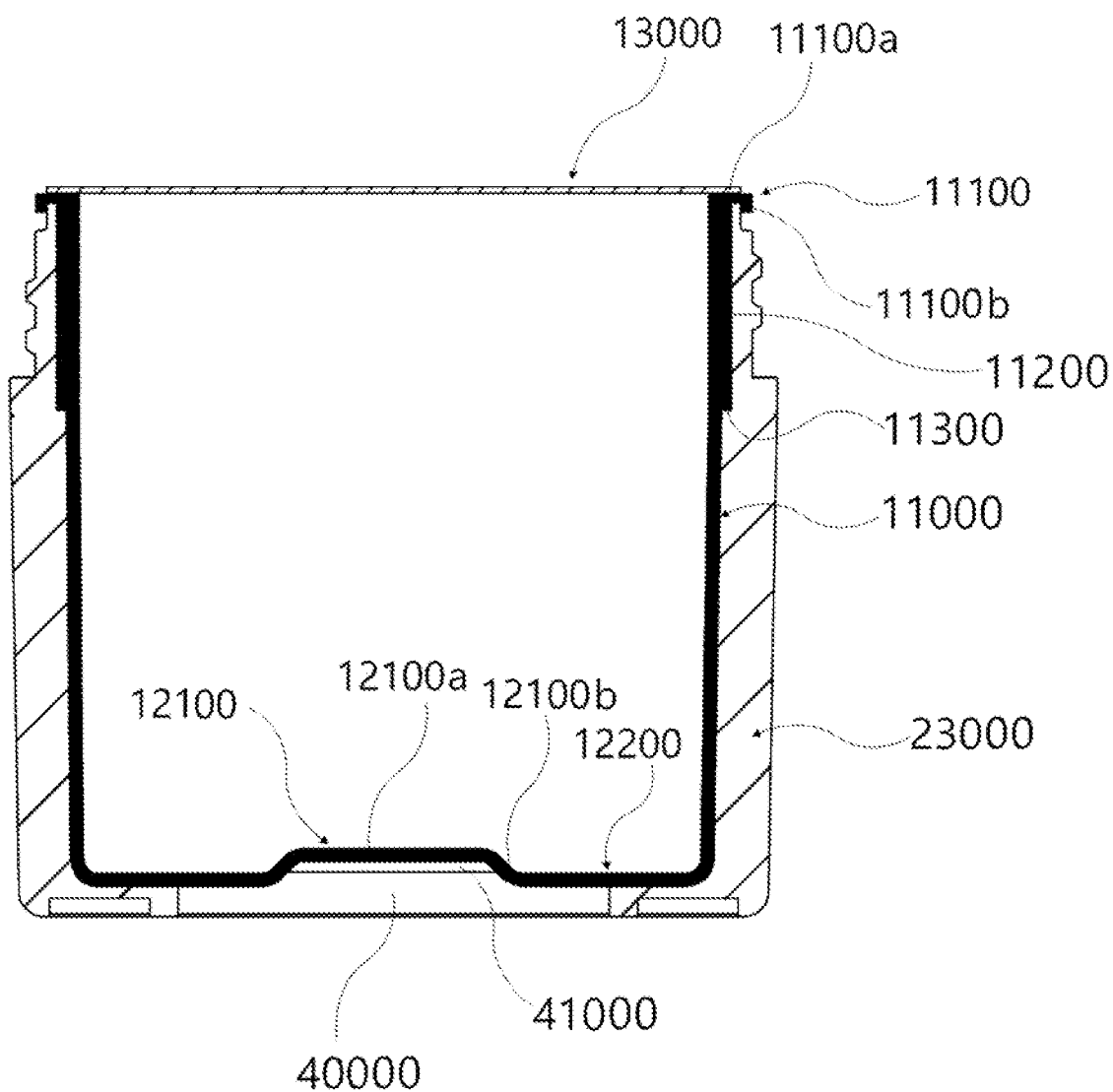

Further, as illustrated in FIG. 35, the lower portion of the additive tray 23000 is formed of a transparent material 40000, and the QR code sticker 41000 may be attached to the lower portion of the additive storage capsule 10000.

The QR code may be configured to provide various information such as the type of additive, content of ingredients, shelf life, and manufacturer of the additive. However, this is merely an example, and it may be configured to provide other various pieces of information.

Although the present invention has been described in connection with various embodiments thereof as illustrated in the drawings, this is merely an example, and it will be appreciated by one skilled in the art that various changes and other equivalents thereof may be made. Accordingly, the scope of the present invention should be determined by the technical spirit of the invention as claimed in the claims.

INDUSTRIAL AVAILABILITY

The present invention relates to a tumbler for beverage making, which allows the user to easily make a beverage by adding the additive to drinking water by pumping as necessary and may maintain airtightness to prevent the beverage from leaking out, and an additive storage capsule inserted and used in the tumbler. According to the present invention, the airtight means may provide enhanced airtightness to prevent the additive from leaking out when the beverage is made. Therefore, upon pumping or use, it is possible to prevent leakage of the beverage or additive and hence waste of the additive while enhancing hygiene when the tumbler is carried.

The invention claimed is:

1. A tumbler for beverage making, comprising:
   a drinking water tray including a lower tray having a drinking water storage space having an open upper portion and a closed lower portion and storing drinking water or a beverage and an upper tray detachably coupled to the upper portion of the lower tray to shield the upper portion of the lower tray, the upper tray having a mouthpiece through which a user may drink the drinking water or beverage in the drinking water storage space;
   an additive tray detachably coupled to a lower end of the drinking water tray and having an additive storage space storing an additive therein; and
   a pumping unit installed through the drinking water tray and the additive tray, the pumping unit pumping the additive to the drinking water storage space, wherein the pumping unit includes:
   a pumping button part installed to slidingly reciprocate on the upper tray and moved when pressurized by the user; and a pumping part positioned in the drinking water storage space of the lower tray, ascending or descending by the reciprocation of the pumping button part, connected to communicate the drinking water storage space and the additive storage space to suck the additive and discharge the additive to the drinking water storage space when ascending or descending.

2. The tumbler of claim 1, wherein the pumping unit further includes an airtight means that is coupled to the pumping button part to partition the pumping button part from the drinking water storage space to maintain airtightness and that shields the pumping button part from the drinking water storage space.

3. The tumbler of claim 2, wherein the airtight means is formed in a cylindrical tube shape having an open upper portion and a closed lower portion, wherein the pumping button part is inserted into an inner surface of the airtight means to allow a lower surface of the pumping button part to contact an inner bottom surface of the airtight means, and wherein an outer lower surface of the airtight means contacts an upper end of the pumping part.

4. The tumbler of claim 3, wherein the airtight means is formed of a bellows having a plurality of corrugations formed along a circumferential direction thereof on an outer circumferential surface thereof to extend or contract in an upper or lower direction.

5. The tumbler of claim 4, wherein the bottom surface of the airtight means includes a convex portion protruding in any one or more of an upper direction or a lower direction to reduce a contact area with a stem part or the pumping part.

6. The tumbler of claim 2, wherein the pumping button part includes:
a stem part installed to be slidably movable in an insertion hole of the drinking water tray and having an upper portion exposed to an outside of the drinking water tray to be pressurized by the user and a lower portion transferring an external force to the pumping part; and
a guide bushing in which the stem part is inserted to reciprocate and guiding the stem part.

7. The tumbler of claim 6, wherein the pumping part includes:
a suction tube shaped as a hollow tube having a first side extending to an inside of the additive tray to communicate with the additive storage space and a second side disposed in the drinking water storage space;
a piston part located in the drinking water storage space and connected to communicate with the second side of the suction tube to suck the additive from the suction tube by reciprocation of the pumping button part; and
a discharge tube shaped as a hollow tube extending from an end of the piston part to discharge the pumped additive to the drinking water storage space.

8. The tumbler of claim 7, wherein the discharge tube further includes a sliding opening/closing part provided on an outer circumferential surface and slidingly moved by the user's manipulation to open a space for moving the additive which communicates with the discharge tube.

9. The tumbler of claim 7, wherein the suction tube is provided with a mesh at a suction end.

10. The tumbler of claim 7, wherein the piston part includes:
a piston rod interlocked with the pumping button part to be moved up or down by the reciprocation of the pumping button part and having a flow path formed therein;
a piston housing installed to al low the piston rod to ascend or descend in an internal space and connected to communicate with each of the suction tube and the discharge tube, the additive being introduced into the internal space by the ascent or descent of the piston rod; and
an elastic member coupled with the piston rod to provide a restoring force to the piston rod.

11. The tumbler of claim 10, wherein the piston housing includes:
a piston body having the internal space and an open upper portion; and
a piston cover coupled to the upper portion of the piston body to shield the upper portion of the piston body, wherein the piston body is formed with one or a plurality of detachable grooves in an inner circumstantial surface of an upper end, and wherein the piston cover has a detachable protrusion formed on an outer circumferential surface, the detachable protrusion elastically fitted and coupled to the detachable groove by the elastic member according to rotation.

12. The tumbler of claim 11, wherein the pumping part further includes an opening/closing valve installed at a lower portion of the piston housing connected to the suction tube to selectively open or close the suction tube according to the ascent or descent of the piston rod.

13. The tumbler of claim 12, wherein the opening/closing valve is installed on a valve flowpath communicating with the suction tube and the internal space of the housing and moving according to the ascent or descent of the piston rod to open or close the valve flowpath.

14. The tumbler of claim 2, wherein the pumping unit is installed along a longitudinal direction of the additive tray and the drinking water tray, and wherein the pumping unit is positioned adjacent to an inner surface of the additive tray and the drinking water tray.

15. The tumbler of claim 1, wherein the upper tray includes:
a closure part detachably coupled to the lower tray and having an upper surface through which the mouthpiece is formed and the pumping unit is installed apart from the mouthpiece;
a rotary closing part rotatably coupled to an upper portion of the closure part and rotating around a rotation shaft extending inwardly and downward, the rotary closing part having an opening formed to expose the closure part to allow an upper portion of the pumping unit or the mouthpiece to be exposed through the opening upon rotation; and
a shielding support positioned in a lower portion of the closure part and having an upper portion fixed to the rotary closing part, the shielding support configured to move along an axial direction of the rotary closing part and rotate as the rotary closing part rotates to open or close the mouthpiece when the rotary closing part rotates.

16. The tumbler of claim 15, wherein the upper tray has use states divided into a storage mode, a drinking mode, and a pumping mode according to a relative rotation position of the closure part and the rotary closing part, wherein in the storage mode, the mouthpiece and the pumping unit are shielded to stop the user from drinking the drinking water or beverage and operation of the pumping unit, and the mouthpiece is shielded by the shielding support, wherein in the drinking mode, the mouthpiece is open through the opening to allow the user to drink the drinking water or beverage through the mouthpiece, and wherein in the pumping mode, the mouthpiece is shielded through the opening, and the pumping unit is open to allow the user to operate the pumping unit, and the mouthpiece is shielded by the shielding support.

17. The tumbler of claim 15, wherein the upper tray sequentially switches from the drinking mode to the storage mode and the pumping mode as rotating clockwise or counterclockwise from the drinking mode.

18. The tumbler of claim 15, wherein the shielding support includes:
a rotation shaft part coupled to the rotation shaft to ascend or descend along the rotation shaft;
a support body allowing the rotation shaft part to be rotatably inserted thereinto and having an upper end and lower end supported by the rotation shaft part to ascend or descend in interlocking with the rotation shaft part; and
a shielding part having a first end coupled to an outer surface of the support body and a second end extending from the first end to open or close the mouthpiece.

19. The tumbler of claim 18, wherein the rotation shaft includes a screw part formed on an outer circumferential surface thereof wherein the rotation shaft part has a cam screw formed on an inner circumferential surface of an insertion hole through which the rotation shaft is inserted, the cam screw engaged with the screw part, and wherein a horizontal screw is formed in a section from the pumping mode to the storage mode, and an inclined screw is formed in a section from the storage mode to the drinking mode.

20. The tumbler of claim 18, wherein the rotation shaft includes a screw part formed on an outer circumferential surface thereof, wherein the rotation shaft part has a cam screw formed on an inner circumferential surface of an insertion hole through which the rotation shaft is inserted, the cam screw engaged with the screw part, and wherein a horizontal screw is formed in a section from the pumping mode to a preset position between the storage mode and the drinking mode, and an inclined screw is formed in a section from the preset position between the storage mode and the drinking mode to the drinking mode.

21. The tumbler of claim 15, wherein the shielding support includes:
a rotation shaft part coupled to the rotation shaft to ascend or descend along the rotation shaft;
a support body allowing the rotation shaft part to be rotatably inserted thereinto and having an upper end supported by the rotation shaft part to descend in interlocking with the rotation shaft part;
an elastic member having an upper end supported by a lower portion of the support body and a lower end supported by a lower end of the rotation shaft part to add an elastic supporting force to the support body upwards; and
a shielding part having a first end coupled to an outer surface of the support body and a second end extending from the first end to open or close the mouthpiece.

22. The tumbler of claim 21, wherein the rotation shaft part comes in contact with the support body in a preset position and descends along with the support body while moving from an upper position downwards by rotation of the rotation shaft, and wherein the contact position is set as a position of the storage mode.

23. The tumbler of claim 21, wherein the rotation shaft part comes in contact with the support body in a preset position and descends along with the support body while moving from an upper position downwards by rotation of the rotation shaft, and wherein the contact position is set as a position between the storage mode and the drinking mode.

24. The tumbler of claim 15, wherein the shielding support includes:
an air shielding part coupled to protrude from an outer surface of the support body and extending to open or close an air hole formed in the closure part by rotation of the rotation shaft part; and
a balance support coupled to protrude from the outer surface of the support body between the shielding part and the air shielding part to prevent eccentricity with the shielding part and the air shielding part with respect to the rotation shaft part.

25. The tumbler of claim 24, wherein the closure part has a guide slit to which an upper side surface of the shielding support is fitted to guide upward or downward movement of the shield support and restrict rotation.

26. The tumbler of claim 24, wherein the upper tray has an arc-shaped guide groove formed in a lower side surface of the rotary closing part and corresponding to a radius of rotation of the rotary closing part for the drinking mode, the pumping mode, and the storage mode and an anti-rotation stopper protrusion protruding from an upper surface of the closure part and fitted to the guide groove to restrict a rotation angle of the rotary closing part.

27. The tumbler of claim 26, wherein at least one of a side surface of the stopper protrusion and an inner surface of the guide groove, facing each other, has an inclined surface formed to reduce an external force of escaping the stopper protrusion from the guide groove.

28. The tumbler of claim 16, wherein the rotary closing part has an arc-shaped anti-leak groove formed in a lower side surface and corresponding to a radius of rotation of the rotary closing part and a stopper protrusion positioned apart inward of the anti-leak groove and protruding from the lower side surface, and wherein the closure part has an air hole formed therethrough to communicate with the drinking water storage space, a seating protrusion protruding from an upper surface and fitted to the anti-leak groove, and an arc-shaped guide groove formed in the upper surface and to which the stopper protrusion is fitted.

29. The tumbler of claim 28, wherein at least one of a side surface of the stopper protrusion and an inner surface of the guide groove, facing each other, has an inclined surface formed to reduce an external force of escaping the stopper protrusion from the guide groove.

30. The tumbler of claim 28, wherein the anti-leak groove is located on the same circumference as the air hole to coincide with a movement path of the air hole when the rotary closing part is rotated, and wherein the air hole is formed to be smaller than a width of the anti-leak groove to be positioned within the width of the anti-leak groove.

31. The tumbler of claim 28, wherein the rotary closing part has an anti-escape part formed in the anti-leak groove to prevent the seating protrusion placed in a corresponding position from escaping off in the storage mode, and wherein the anti-escape part includes an anti-escape groove formed in a bottom surface of the anti-leak groove to seat the seating protrusion therein and a stepped portion formed in each of a front end and a rear end of the anti-escape groove.

32. The tumbler of claim 15, wherein the lower tray further includes a guide tube positioned in the drinking water storage space and allowing the pumping unit to be inserted inward.

33. The tumbler of claim 15, wherein the lower tray includes:

a first body formed in a cylindrical shape having a closed lower portion and an open upper portion and having a through-hole through which the pumping unit is installed;

a second body fixed to an inside of the first body, having the drinking water storage space formed therein, and coupled with the pumping unit; and a coupling part having a lower end fittingly coupled to the first body in contact with an upper end of the second body and detachably coupled with the closure part.

34. The tumbler of claim 33, wherein the second body is configured to include the piston housing.

35. The tumbler of claim 15, wherein the additive tray has an open upper portion and a shielded lower end, includes the additive storage space inside, and is detachably coupled to a lower portion of the drinking water tray.

36. The tumbler of claim 1, further comprising an air introduction means installed on an air introduction passage where an outside and the additive storage space communicate with each other and selectively opening or closing the air introduction passage to selectively introduce external air to the additive storage space.

37. The tumbler of claim 36, wherein the air introduction passage is formed on a lower surface of the lower tray, wherein the air introduction means is installed at an outer lower portion of the lower tray, and wherein the air introduction means selectively opens or closes the air introduction passage by external force to introduce air to the additive storage space.

38. The tumbler of claim 37, wherein the air introduction means includes:

an introduction button body installed on the air introduction passage and reciprocated by external force to selectively open or close the air introduction passage; and an elastic spring installed in the introduction button body to provide a restorative force to the introduction button body in a direction of shielding the air introduction passage.

39. The tumbler of claim 36, wherein the air introduction passage is formed on a lower surface of the lower tray, wherein the air introduction means is installed at a bottom portion of the lower tray, and wherein the air introduction means selectively opens or closes the air introduction passage according to a difference in atmospheric pressure between an inside and outside of the additive tray to move air outside the additive tray to the inside of the additive tray.

40. The tumbler of claim 39, wherein the air introduction means is formed of an elastic material and is configured as an elastic button that is elastically deformed by the difference in atmospheric pressure between the inside and outside of the additive tray to selectively open or close the air introduction passage.

41. The tumbler of claim 40, wherein the air introduction means is installed at an end of the air introduction passage in the additive storage space.

42. An additive storage capsule embedded and used in a tumbler and coupled to a lower end of the tumbler and inserted into an additive tray for receiving an additive pumped into an inside of a body of the tumbler, the additive storage capsule comprising:

a side wall part positioned in contact with an inner surface of the additive tray;

a bottom portion positioned in contact with a bottom surface of the additive tray; and a sealing film sealing an upper portion of the side wall part, wherein the bottom portion includes a bottom protrusion protruding inwardly and upward in a central portion thereof and a bottom surface portion formed between the bottom protrusion and the side wall part.

43. The additive storage capsule of claim 42, wherein the bottom protrusion includes:

an inclined surface extending inward and upward from a bottom surface at a predetermined angle with respect to a vertical direction of the bottom surface; and an upper surface horizontally extending inward from the inclined surface.

44. The additive storage capsule of claim 43, wherein a lower surface end of a suction tube for withdrawing the additive is positioned on the bottom surface portion of the additive storage capsule, and wherein an end of the suction tube is positioned between the bottom surface portion and an upper surface of the bottom protrusion.

45. The additive storage capsule of claim 42, wherein a first side of a pumping unit suction tube provided in the tumbler extends to an inside of the additive tray to communicate with the additive storage capsule, and a second side of the pumping unit suction tube is disposed in the drinking water storage space.

46. The additive storage capsule of claim 42, wherein the side wall part includes a protrusion resulting as an upper portion of an outer circumferential surface thereof protrudes outward, and wherein a step part seated on an inner surface of the additive tray is formed at a boundary of the protrusion.

47. The additive storage capsule of claim 46, wherein the step part is formed in a horizontal direction along an outer circumferential surface of the side wall part.

48. The additive storage capsule of claim 46, wherein the step part is formed in a shape in which a linear portion having a positive inclination angle with respect to a horizontal direction along the outer circumstantial surface of the side wall part and a linear portion having a negative inclination angle are alternately and continuously connected.

49. The additive storage capsule of claim 46, wherein the step part is formed in a shape in which an arc portion having a positive curvature with respect to a horizontal direction along the outer circumferential surface of the side wall part and an arc portion having a negative curvature are alternately and continuously connected.

50. The additive storage capsule of claim 49, wherein the arc portion having the positive curvature and the arc portion having the negative curvature each are formed of a combination of two arcs having different center points.

51. The additive storage capsule of claim 42, wherein a seating part for being seated on an upper edge of the additive tray is formed on an upper edge of the side wall part.

52. The additive storage capsule of claim 51, wherein the seating part includes:

a horizontal plate extending outwardly and in parallel by a distance corresponding to a thickness of the upper edge of the additive tray from the upper end of the side wall part; and a vertical plate extending a predetermined distance downward from an end of the horizontal plate.

53. The additive storage capsule of claim 42, wherein the sealing film is adhered to an upper edge of the side wall part, and wherein the sealing film is separated from the upper edge of the side wall part when the additive storage capsule is inserted into the additive tray.

54. The additive storage capsule of claim 42, wherein a QR code sticker is attached to a lower surface of the bottom portion.

* * * * *